US008638665B2

(12) United States Patent
Takagi et al.

(10) Patent No.: US 8,638,665 B2
(45) Date of Patent: Jan. 28, 2014

(54) ROUTER, INFORMATION PROCESSING DEVICE HAVING SAID ROUTER, AND PACKET ROUTING METHOD

(75) Inventors: Masamichi Takagi, Tokyo (JP); Sunao Torii, Tokyo (JP)

(73) Assignee: NEC Corporation, Tokyo (JP)

( * ) Notice: Subject to any disclaimer, the term of this patent is extended or adjusted under 35 U.S.C. 154(b) by 458 days.

(21) Appl. No.: 12/935,035

(22) PCT Filed: Apr. 30, 2009

(86) PCT No.: PCT/JP2009/058455
§ 371 (c)(1),
(2), (4) Date: Sep. 28, 2010

(87) PCT Pub. No.: WO2009/133918
PCT Pub. Date: Nov. 5, 2009

(65) Prior Publication Data
US 2011/0026405 A1 Feb. 3, 2011

(30) Foreign Application Priority Data

Apr. 30, 2008 (JP) ................................. 2008-119019

(51) Int. Cl.
*G06F 11/00* (2006.01)

(52) U.S. Cl.
USPC ........................................................ 370/235

(58) Field of Classification Search
USPC .......................................... 370/235; 710/317
See application file for complete search history.

(56) References Cited

U.S. PATENT DOCUMENTS

| 6,956,861 B2 * | 10/2005 | Reed et al. | 370/412 |
| 7,852,836 B2 * | 12/2010 | Scott et al. | 370/388 |
| 2005/0027880 A1 * | 2/2005 | Emmot | 709/238 |
| 2007/0140240 A1 * | 6/2007 | Dally et al. | 370/389 |
| 2009/0024783 A1 * | 1/2009 | Rhim et al. | 710/316 |
| 2009/0037671 A1 * | 2/2009 | Bower et al. | 711/154 |

FOREIGN PATENT DOCUMENTS

| JP | 8-251196 A | 9/1996 |
| JP | 11-504496 A | 4/1999 |
| JP | 2006254450 A | 9/2006 |
| JP | 2007500985 A | 1/2007 |
| JP | 2007110706 A | 4/2007 |

OTHER PUBLICATIONS

Peh, Li-Shivan; Flow Control and Micro-Architectural Mechanisms for Extending the Performance of Interconnection Networks; Aug. 2001; Stanford University.*

(Continued)

*Primary Examiner* — Mark Rinehart
*Assistant Examiner* — Christopher R Crompton

(57) ABSTRACT

A router includes: a flit arrival time management section that records flit arrival time which is the time at which the packet is received for the first time, transmission interval of the packet which are acquired from a control packet transmitted prior to the first transmission of a packet and input and output channels of the control packet and requires a crossbar section for an output channel from which the packet is supposed to be output before the flit arrival time; a switch assignment section that performs arbitration on the output channel request and performs input/output connection relationship setting processing; and a switch assignment verification section that verifies whether a result of the input/output connection relationship setting processing coincides with the actual routing of the packet. The cross bar section performs switching of the arriving packet using a result of the input/output connection relationship processing.

20 Claims, 22 Drawing Sheets

(56) References Cited

OTHER PUBLICATIONS

International Search Report for PCT/JP2009/058455 mailed Jun. 2, 2009.
William James Dally et al., "Principles and Practices of Interconnection Networks", Morgan Kaufmann, 2004, pp. 305-312
M. Galles "Scalable Pipelined Interconnect for Distributed Endpoint Routing The SGI SPIDER Chip", In proc. Hot Interconnects IV Symp., Aug. 1996.
Li-Shiuan Peh et al., "A Delay Model and Speculative Architecture for Pipelined Routers", In proceedings of the 7th International Symposium on High-Performance Computer Architecture, Jun. 2001, pp. 255-266.
S. Kamakura et al., "Dynamic Predictive Routing for 2-D Torus Networks" Summer United Workshops on Parallel, Distributed and Cooperative Processing (SWoPP) 2006, 2006, pp. 1-6.
Li-Shiuan Pen et al., "Flit-Reservation Flow Control", In proceedings of the 6th International Symposium on High-Performance Computer Architecture, Jan. 2000.
H. Murakami et al., "Lowering Network Latency: Utilizing a Communication Prediction Mechanism and its Evaluation", Information Processing Society of Japan Technical Report, vol. 2007, No. 115, Nov. 21. 2007, pp. 27-32.
Japanese Office Action for JP Application No. 2010-510160 mailed on May 15, 2013 with Partial English Translation.
Stuijk, S. et al., "Resource-Efficient Routing and Scheduling of Time-Constrained Network-on-Chip Communication", Proceedings of the 9th EUROMICRO Conference on Digital System Design (DSD 2006), 2006, pp. 45-52.
Shi, Z. et al., "Real-Time Communication Analysis for On-Chip Networks with Wormhole Switching", Second ACM/IEEE International Symposium on Networks-on-Chip (NoCS 2008), Apr. 7, 2008, pp. 161-170.

\* cited by examiner

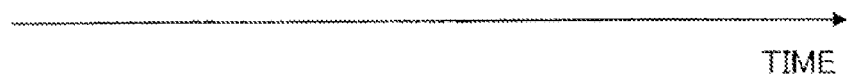

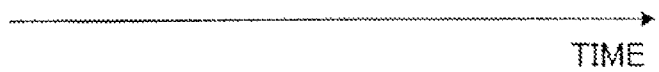

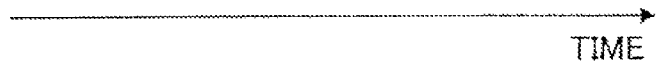

FIG.6

| TIME | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| PACKET | A | | B | | C | | D | | A | B | C | D | | | | |

| TIME | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| PACKET | A B C D | | | | | D | C | B | A | | D | | C | | B | D |

| TIME | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| PACKET | A | | C | | D | B | | | AC | D | | | B | | | |

| TIME | 49 | 50 | 51 | 52 | 53 | 54 | 55 | 56 | 57 | 58 | 59 | 60 | 61 | 62 | 63 | 64 |
|---|---|---|---|---|---|---|---|---|---|---|---|---|---|---|---|---|
| PACKET | A | | | B | | | CD | | A | B | B | D | C | | | |

FIG.12

| ROUTER NUMBER | FLIT ARRIVAL TIME | INPUT CHANNEL | OUTPUT PORT | TRANSMISSION INTERVAL | NUMBER OF TIMES OF TRANSMISSION | MAXIMUM VALUE OF DEVIATION OF TRANSMISSION INTERVAL |
|---|---|---|---|---|---|---|
| 1 | 5 | IP 1 | ROUTER 2 | 5 | 2 | 2 |
| 2 | 7 | ROUTER 1 | ROUTER 4 | 5 | 2 | 2 |
| 4 | 9 | ROUTER 2 | IP 4 | 5 | 2 | 2 |

FIG.20

| ROUTER NUMBER | FLIT ARRIVAL TIME | INPUT CHANNEL | OUTPUT PORT | TRANSMISSION INTERVAL | NUMBER OF TIMES OF TRANSMISSION | MAXIMUM VALUE OF DEVIATION OF TRANSMISSION INTERVAL |
|---|---|---|---|---|---|---|
| 1 | 5 | IP 1 | ROUTER 2 | 5 | 2 | 2 |
| 3 | 9 | ROUTER 3 | ROUTER 6 | 5 | 2 | 2 |
| 6 | 11 | ROUTER 6 | IP 6 | 5 | 2 | 2 |

ROUTER, INFORMATION PROCESSING DEVICE HAVING SAID ROUTER, AND PACKET ROUTING METHOD

This application is the National Phase of PCT/JP2009/058455, filed Apr. 30, 2009, which is based upon and claims the benefit of priority from prior Japanese Patent Application No. 2008-119019, filed Apr. 30, 2008, the entire contents of which are incorporated herein by reference.

TECHNICAL FIELD

The present invention relates to a router for routing a packet, an information processing device having the router, and a packet routing method.

BACKGROUND ART

Development in a process technology makes it possible to mount a large number of Intellectual Properties (IPs) on a single chip, thereby satisfying multi-function and high-performance demand.

In such a chip, one IP needs to communicate with other many IPs and, therefore, a communication network is required. Under the circumstance, a method of connecting IPs to one another by means of point-to-point channels and routers in a structured manner is proposed, which is called Network on Chip (NoC).

FIG. 1 illustrates a general configuration of an information processing device using the NoC technology. As illustrated in FIG. 1, components each including an IP, a network interface, and a router are two-dimensionally arranged. In the left part of FIG. 1, two adjacent components are illustrated in an enlarged manner. An IP 101-1 is connected to a router 103-1 serving as a network node through a network interface 102-1 serving as an interface. An IP 101-2 is connected to a router 103-2 serving as a network node through a network interface 102-2 serving as an interface. The routers 103-1 and 103-2 are connected to each other by a point-to-point channel 104. Each of the IPs 101-1 and 101- is a hardware module such as a processor, a DSP (Digital Signal Processor), or a memory controller.

The IPs communicate with each other by exchanging data called a packet. Between the two adjacent IP 101-1 and IP 101-2, the IP 101-1 sends a packet to the router 103-1. The packet moves from the router 103-1 adjacent to the source IP to the router 103-2 adjacent to the destination IP 101-2, and finally reaches the destination IP 101-2. If the IP 101-1 and IP-101-2 are not adjacent to each other, the packet moves from the router 103-1 to the router 103-2 through one or more routers.

The routers illustrated in FIG. 1 each have a function of connecting a plurality of input channels and a plurality of output channels so as to transfer a packet. That is, each router outputs a packet coming from an input channel to an appropriate output channel so as to send the packet to the next router. The unit of data to be transferred between the routers is referred to as flit, and a packet is composed of one or more flits. Thus, actually, in the case where one packet is sent from one router to another, one or more header flits and zero or more subsequent flits are sent as the packet.

Processing performed by the router includes four tasks: Routing Calculation (RC) for determining the next router; Virtual Channel Allocation (VA) for assigning a virtual channel number to an input packet; Switch Allocation (SA) for arbitrating output channel requests issued to a crossbar in a router to which a packet is input and setting input/output connection relationship of the crossbar according to a result of the arbitration; and Switch Traversal (ST) for being moved the flit in the crossbar.

FIG. 2 is a block diagram of a typical router. The SA is also referred to input/output correspondence assignment processing. In FIG. 2, an IP section 212 corresponding to the IP of FIG. 1 is illustrated in addition to the router.

A related art concerning a system including a router for routing a packet and an IP will be described.

Referring to FIG. 2, a flit is input through an input channel 201 and buffered in an input port section 202. At this timing, a routing calculation section 206 determines which router is the next hop, that is, from which output channel the flit is to be output.

A virtual channel assignment section 207 determines a virtual channel number of a packet. A switch assignment section 209 performs arbitration between output channels for a plurality of packets in the input channel 201 or input port section 202 to determine an input/output relationship in a crossbar section 210. The flit passes through the crossbar section 210 and is then output to an appropriate output channel 211. A credit input 208 is input to the virtual channel assignment section 207, and a credit output 216 is output from the input port section 202.

NPL 1 discloses a technique that performs the above four tasks of the router in parallel or in a pipelined manner as much as possible so as to achieve a reduction of router's processing time and an increase of throughput. The operations of the four tasks depend on one another to some extent, so that processing cannot be completed in one stage. For example, the RC and SA depend on each other. Therefore, a pipeline stage includes, e.g., four stages. FIG. 3A illustrates a configuration example of the pipeline stage.

NPL 2 discloses a technique that reduces router's processing time by bringing the task of the router forward. That is, at the time point when a packet reaches a given router, the Routing Calculation (RC) for the next router is performed in advance. In this way, the task of the RC is brought forward. FIG. 3B illustrates a configuration view of a pipeline stage obtained as a result of application of this technique.

NPL 3 discloses a technique that reduces router's processing time by speculatively executing the VA and SA in parallel. FIG. 3C illustrates a configuration example of a pipeline stage obtained as a result of application of this technique.

Referring to FIG. 4, in a router according to related art (e.g., NPL 4), a prediction section 303 predicts an output channel 311 corresponding to an input channel 301 at which a flit is expected to arrive. After that, the flit enters from the input channel 301 to the router inputs. The packet passes through a crossbar section 301 and is output to the output channel 311. A credit input 308 is input to a virtual channel assignment section 307, and a credit output 316 is output from an input port section 302. A routing calculation section 306, a virtual channel assignment section 307, and a switch assignment section 309 have the same functions as those of the routing calculation section 206, a virtual channel assignment section 207, and a switch assignment section 209. An IP section 312 and a crossbar section 310 have the same functions as those of the IP section 212 and crossbar section 210.

The prediction is verified by the routing calculation section 306. If the prediction fails, the packet is invalidated before the packet reaches the next router. By performing input/output connection relationship setting processing of a crossbar switch in advance through the prediction, the operation of Switch Allocation (SA) is brought forward. FIG. 3(D) illustrates a configuration example of a pipeline stage obtained as a result of application of this technique.

Referring to FIG. 5, a router according to related art (e.g., NPL 5) transmits a control packet to a destination router before transmitting a data packet. When the control packet is input to a router located on the traffic path, a routing calculation section 402 of the router determines an output channel. Further, an output schedule section 403 calculates the time at which both the output channel of the router and an input channel of the next router are unoccupied and records the calculation results in an output reservation table section 404. Subsequently, an input schedule section 405 records the arrival time of the data packet, the number of the input buffer in which the arrived data packet is stored, and time at which the data packet moves to an output channel 410, in an input reservation table section 406. Further, the time at which the data packet moves to the output channel 410, the number of the input buffer in which the data packet is stored, and an output channel number are recorded in an output reservation table section 404. A credit input 416 is input to the output reservation table section 404, and a credit output 417 is output from an input port section 408. A control packet output channel 418 is connected to the output schedule section 403.

In FIGS. 2, 4, and 5, the input port sections 202, 302, and 408 each have N input ports, while in an information processing device using the NoC technology illustrated in FIG. 1, each router has five input ports, that is, N is 5. In FIGS. 2 and 4, only one routing calculation section (206 or 306) is illustrated; actually, however, the routing calculation section is provided by the number of input ports.

As conventional art literatures relevant to the NoC, PLT 1, PLT 2, and PLT 3 exist.

CITATION LIST

Patent Literature

{PTL 1} JP-A-2006-254450
{PLT 2} JP-A-2007-110706
{PLT 3} Japanese Unexamined Patent Application Publication (Translation of PCT Application) No. 1999-504496
{Non-Patent Literature}
{NPL 1} William James Dally and Brian Towles, "Princ I P les and Practices of Interconnection Networks", Morgan Kaufmann Publishers, pp. 305-312, 2004.
{NPL 2} M. Galles, "Scalable P I Pelined Interconnect for Distributed Endpoint Routing: The SGI Spider Ch I P", In proc. Hot Interconnects IV Symp., pp. 141-146, August 1996.
{NPL 3} Li-Shivan Peh, William J. Dally, "A Delay Model and Speculative Architecture for P I Pelined Routers", In proceedings of the 7th International Symposium on High-Performance Computer Architecture, 2001.
{NPL 4} Shojiro Kamakura, Tsutomu Yoshinaga, Michihiro Koibuchi,"Dynamic predictive Routing For 2D Torus Networks" SWoPP2006, 2006.
{NPL 5} Li-Shivan Peh and William J. Dally, "Flit-Reservation Flow Control", In proceedings of the 6th International Symposium on High-Performance Computer Architecture, pp. 73-84, January 2000.

SUMMARY OF INVENTION

Technical Problem

However, PLT 1, PLT 2, and PLT 3 listed above merely describe the outline of a technique that transfers a flit received from a given router to another router using a crossbar switch and do not describe a reduction of routing time.

Further, a first problem of the router according to related art is that accuracy of the prediction of the input and output channels is low in the packet exchange at fixed time intervals, making it difficult to reduce router's processing time.

For example, the packet router according to NPL 4 performs the prediction for a given input channel by referring to the past history of the output channel.

The history traced back by m in a manner as t−1, t−2, ..., t−m (t is the current cycle, and m is natural number) is compared with the history traced back in a manner as t−1−k, t−2−k, ..., t−m−k (k is natural number) to search for a matching history that m becomes maximum. Then, the values of m and k at that time are set to m' and k', and an output channel of t−k' is predicted as the output channel of t.

FIG. 6 illustrates an example of the above prediction. A table of FIG. 6 represents output channels that four packets require to be assigned to a given input channels of a given router in each cycle. "A", "B", "C" and "D" represent four output channels. One cycle indicates the minimum time required for one router to complete a given operation, e.g., the minimum time required for a packet to pass through one router.

For the output channel A, corresponding packet is transmitted at an interval of eight cycles. For the output channel B, corresponding packet is transmitted at an interval of seven cycles. For the output channel C, corresponding packet is transmitted at an interval of six cycles. For the output channel D, corresponding packet is transmitted at an interval of five cycles. In this case, as illustrated in the table of FIG. 6, it is difficult to predict the output channel that is expected to be required in future from the history of the previously required output channel. This may reduce the accuracy of prediction of the input and output channels, preventing a reduction of router's processing time.

A second problem of the router according to related art is that the amount of the control packets input into a network increases to incur an increase of network delay.

For example, the router according to NPL 5 transmits a control packet before transmitting a data packet. In the case where the control packet is input into the same network as that into, which the data packet is input, the total amount of the packets increases to incur an increase of network delay.

The present invention has been made in view of the above problems, and an exemplary object thereof is to provide a router, an information processing device, and a packet routing method that bring forward predetermined processing in a router of a network of a computer or an IP to achieve a reduction of routing time.

Solution to Problem

To solve the above problems, an exemplary router according to the present invention includes: an input port section to which packets transmitted by a plurality of times at a fixed interval and a control packet transmitted prior to the packets are input from a plurality of input channels;
a crossbar section that connects a plurality of outputs of the input port section, a plurality of input channels and a plurality of output channels;
a flit arrival time management section that requires an output channel a plurality of times to the crossbar section before the flit arrival time, the output channel being an output channel from which the packet is expected to be output;
a switch assignment section that performs, according to the request from the flit arrival time management section, input/output connection relationship setting processing of setting a connection relationship between the outputs of the input port and the output channels before the flit arrival time and, if there are a plurality of the requests and congestion of the requests occurs, arbitrates the requests before the flit arrival time for the input/output connection relationship setting processing; and a switch assignment verification section that verifies whether a result of the input/output connection relationship setting processing corresponds with the actual routing of the packet, in which the flit arrival time management section acquires, from the control packet, control packet information including transmission start time of the packets and transmission interval of the packet, calculates flit arrival time which is the time at which the packet is received based on the control packet information, records the flit arrival time, the transmission interval included in the control packet information, and input and output channels of the control packet, and makes the request a plurality of times based on the recoded information, and the crossbar section performs switching of the arriving packet using a result of the input/output connection relationship processing.

To solve the above problems, an exemplary packet routing method according to the present invention including:

a step of recording, in the case where a transmission source transmits packets by plurality of times at a fixed interval, control packet information including transmission start time of the packets and transmission interval of the packet in a control packet;

a control packet input step of transmitting the control packet prior to the transmission of the packets;

a flit arrival time management step in which in the case where a router exists on a route up to a transmission destination of the packet, the router receives the control packet, acquires control packet information from the received control packet, calculates flit arrival time which is the time at which the packet is received for the first time based on the control packet information, records the flit arrival time, the transmission interval included in the control packet information, and input and output channels of the control packet, and requires an output channel from which the packet is supposed to be output, to a crossbar section of the router, based on the recoded information before the flit arrival time;

a switch assignment step of performing, according to the request, input/output connection relationship setting processing of setting a connection relationship between the input and output channels before the flit arrival time and, if there are a plurality of the requests and congestion of the requests occurs, arbitrating the requests before the flit arrival time for the input/output connection relationship setting processing;

a step in which the crossbar section performs switching of the arriving packet using a result of the input/output connection relationship processing; and a switch assignment verification step of verifying whether a result of the input/output connection relationship setting processing corresponds with the actual routing of the packet.

Advantageous Effects of Invention

According to the present invention, a router is previously notified of the route of a packet, so that processing performed by the crossbar section can be brought forward, thereby reducing routing processing time.

Further, the control packet need not be transmitted for each transmission of a packet, whereby the number of packets input to a network is reduced.

BRIEF DESCRIPTION OF DRAWINGS

{FIG. 6} A view illustrating output channels required in a given router in the case where packets are transmitted at a fixed interval.

{FIG. 12} A table representing data recorded in a flit arrival time management section of each router in a concrete example of the first exemplary embodiment of the present invention.

{FIG. 20} A table representing data recorded in a flit arrival time management section of each router in a concrete example of the second exemplary embodiment of the present invention.

DESCRIPTION OF EMBODIMENTS

Exemplary embodiments of the present invention will be described in detail below with reference to the accompanying drawings. An information processing device according to the present invention is a device including a router according to the present invention. A typical example of such a device includes a semiconductor chip using the NoC technology. In the following exemplary embodiments, this semiconductor chip is used to provide descriptions; however, it should be noted that the information processing device of the present invention is not limited to this. Further, a configuration of a router according to the present invention may be applied to a router for a computer network.

[First Exemplary Embodiment]

Figure 7:
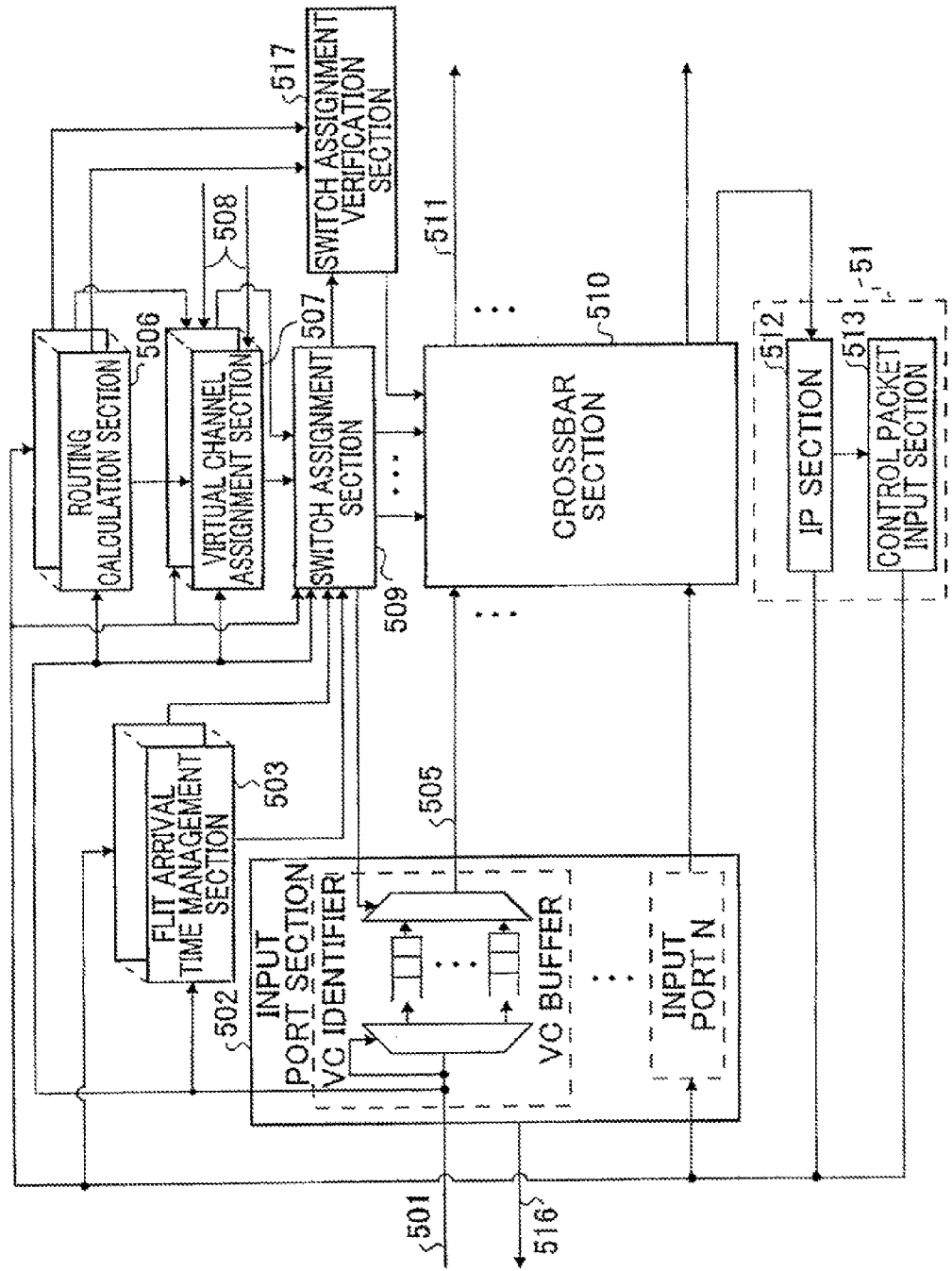
{FIG. 7} A block diagram of a router according to a first exemplary embodiment of the present invention.
Figure 21:
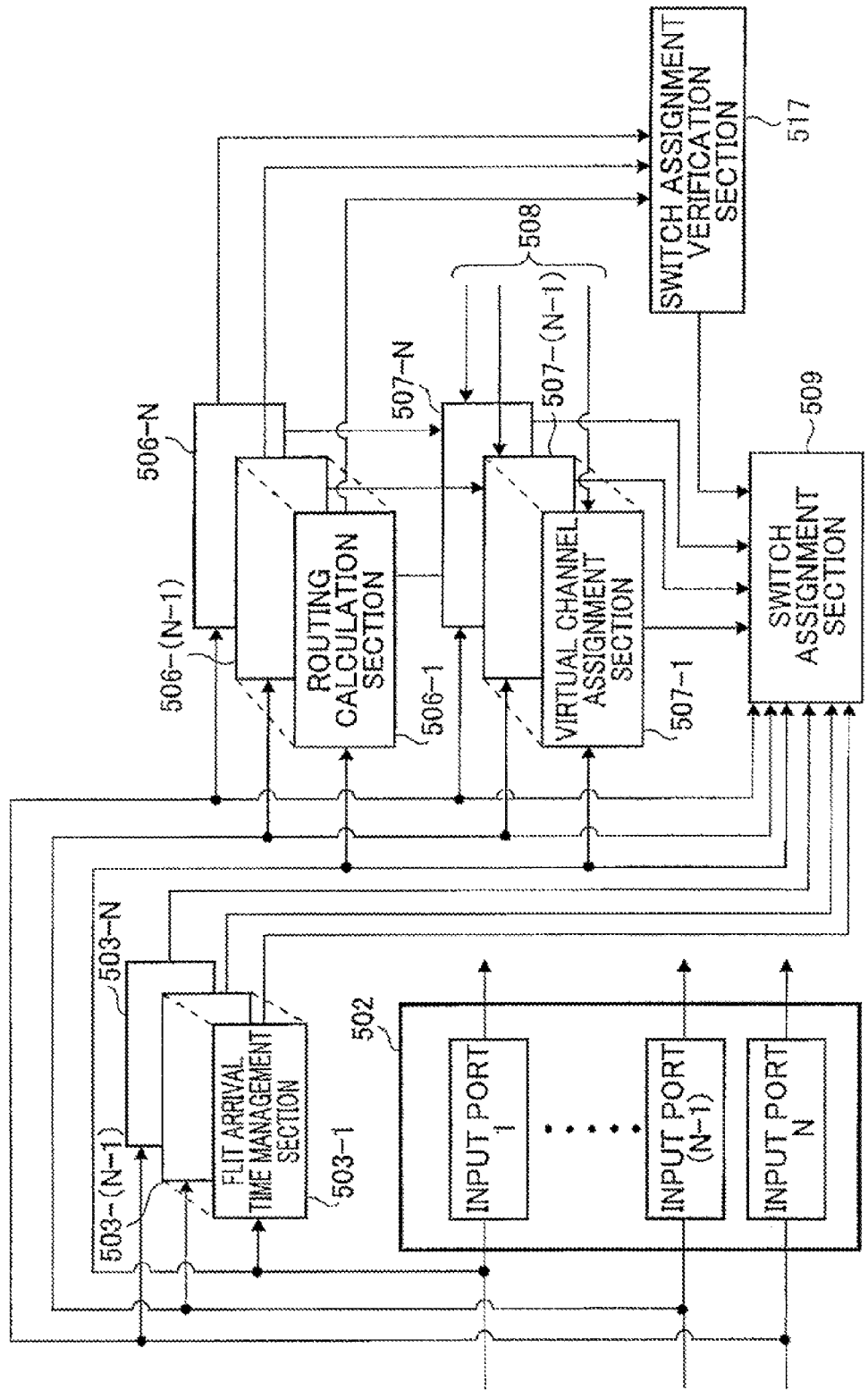
{FIG. 21} A block diagram of a connection relationship between some of the blocks illustrated in FIG. 7.

FIG. 7 is a block diagram of a router according to a first exemplary embodiment of the present invention. In FIG. 7, an IP 51 is illustrated in addition to the router. FIG. 21 is a block diagram illustrating a connection relationship between some of the blocks illustrated in FIG. 7. In FIG. 21, flit arrival time management sections 503-1 to 503-N correspond to a flit arrival time management section 503 of FIG. 7, routing calculation sections 506-1 to 506-N correspond to a routing calculation section 506 of FIG. 7, virtual channel assignment section 507-1 to 507-N correspond to a virtual channel assignment section 507 of FIG. 7.

Referring to FIG. 7, a router according to the first exemplary embodiment of the present invention has an input channel 501 that receives as an input a packet (flit) from a router as the previous hop, an input port section 502 that buffers the flit, a flit arrival time management section 503, a routing calculation section 506 that determines a router as the next hop for the flit, a virtual channel assignment section 507 that assigns a virtual channel number to the packet, a switch assignment section 509 that performs arbitration between flits in the crossbar in the router and performs setting of a connection relationship between input and output channels, and a crossbar section 510 that connects input channels (receiving outputs of the input port section) with output channels. The flit arrival time management section 503 records, in the packet transmission at a fixed interval, flit arrival time, input channel, output channel, interval, number of times of transmission, maximum value of deviation of the interval and requires a plurality of times, to the crossbar section 510, an output channel from which the packet in the input channel is expected to be output before the flit arrival time according to the recorded flit arrival time and interval thereof.

The router according to the first exemplary embodiment of the present invention further has an output channel 511 connected to the next router, an IP section 512 consists of for example, a processor serving as a communicating means, a control packet input section 513 that writes information concerning packet transmission at a fixed interval in a control packet and inputs the resultant control packet to a network, and a switch assignment verification section 517 that verifies whether a connection relationship between the input and output channels of the crossbar section determined by the switch assignment section 509 before arrival of the flit is correct or not.

Figure 11:
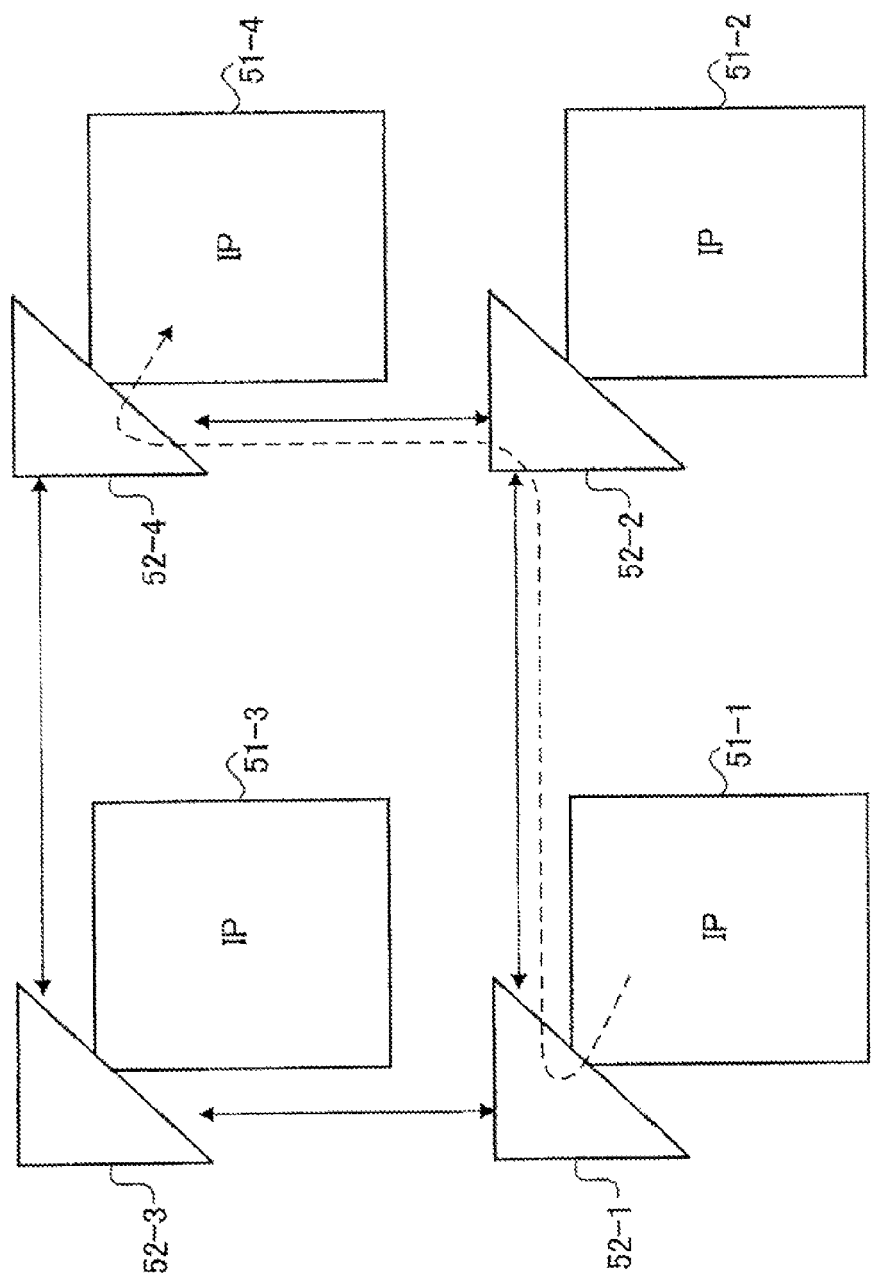
{FIG. 11} A view illustrating a network including the IP and router in a concrete example of the first exemplary embodiment of the present invention.

The IP section 512 and control packet input section 513 constitute the IP 51, and the IP 51 corresponds to each of IPs 51-1 to 51-4 of FIG. 11, respectively. Components other than the IP section 512 and control packet input section 513 of FIG. 7 constitute the router, and the router corresponds to each of routers 52-1 to 52-4 of FIG. 11, respectively. Each of the flit arrival time management section 503, routing calculation section 506, and virtual channel assignment section 507 is provided by the number of input ports. Five input ports are provided in FIG. 11, so that five flit arrival time management sections 503, five routing calculation sections 506, and five virtual channel assignment sections 507 are provided. A credit input 508 is input to each of the virtual channel assignment sections 507 provided by the number of input ports, and a credit output 516 is output from the input port section 502.

Referring to FIG. 7, the router according to the first exemplary embodiment of the present invention is a device that performs the following operation. That is, the control packet input section 513 inputs, to a network, only once a control packet per a plurality of number of times of packet transmission made by the IP section 512 in the packet transmission at a fixed interval from the IP section 512. The IP section 512 writes start time and interval of the packet transmission, number of times of transmission, maximum value of deviation of the interval has been written by the IP section 512, in the control packet.

The flit arrival time management section 503 receives as an input the control packet from the input channel 501 and records information including flit arrival time, input channel, output channel, interval, number of times of transmission, and maximum value of deviation of the interval. The flit arrival time management section 503 further requires a plurality of times, to the crossbar section 510, an output channel from which the flit input to the input channel is expected to be output before the flit arrival time according to the recorded flit arrival time and interval thereof.

The switch assignment section 509 performs arbitration on the requests and then performs input/output connection relationship setting processing of the crossbar section 510 based on a result of the arbitration before the flit arrival time.

The crossbar section 510 performs switching of the arrived flit using a result of previously set input/output correspondence assignment. This brings forward the arbitration for the input channel and input/output connection relationship setting processing to thereby reduce routing time.

The switch assignment verification section 517 verifies whether the result of the previously performed input/output connection relationship setting processing coincides with the routing of the flit that has actually arrived. Further, the router according to the first exemplary embodiment of the present invention performs the following operation with respect to the control packet, packets transmitted at a fixed interval recorded in the control packet, and a packet other than those mentioned above.

The input port section 502 buffers the flit input from the input channel 501. The routing calculation section 506 calculates the next router for the input flit.

The virtual channel assignment section 507 determines the virtual channel number to be assigned to the input packet. The switch assignment section 509 performs arbitration between the output channel requests for the input channel of the crossbar section 510 and setting a connection relationship between the input and output channels.

The crossbar section 510 sends the flit to an appropriate output channel 511.

Figure 8:
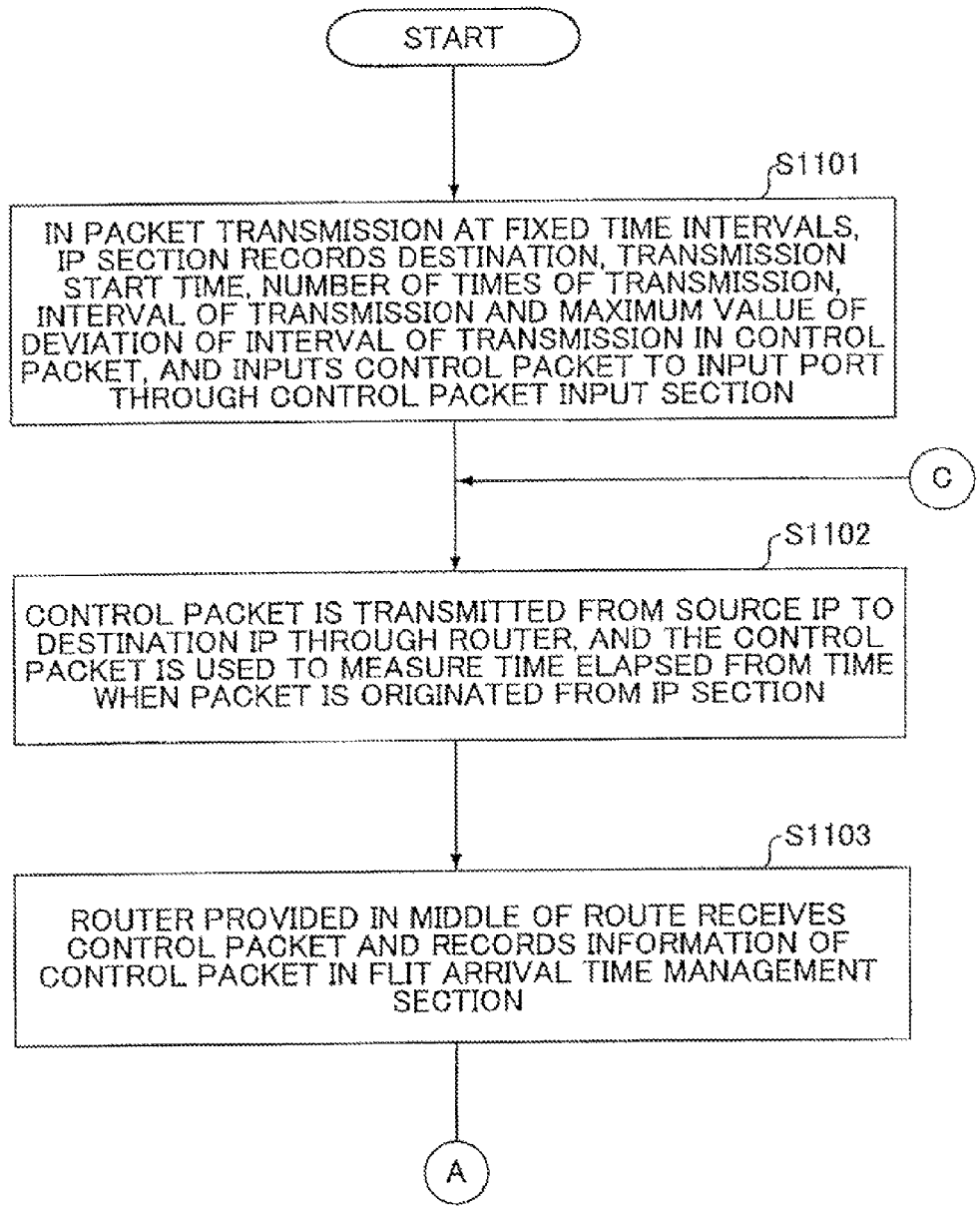
{FIG. 8} A flowchart illustrating an example of processing performed in a router and an IP according to the first exemplary embodiment of the present invention.
Figure 9:
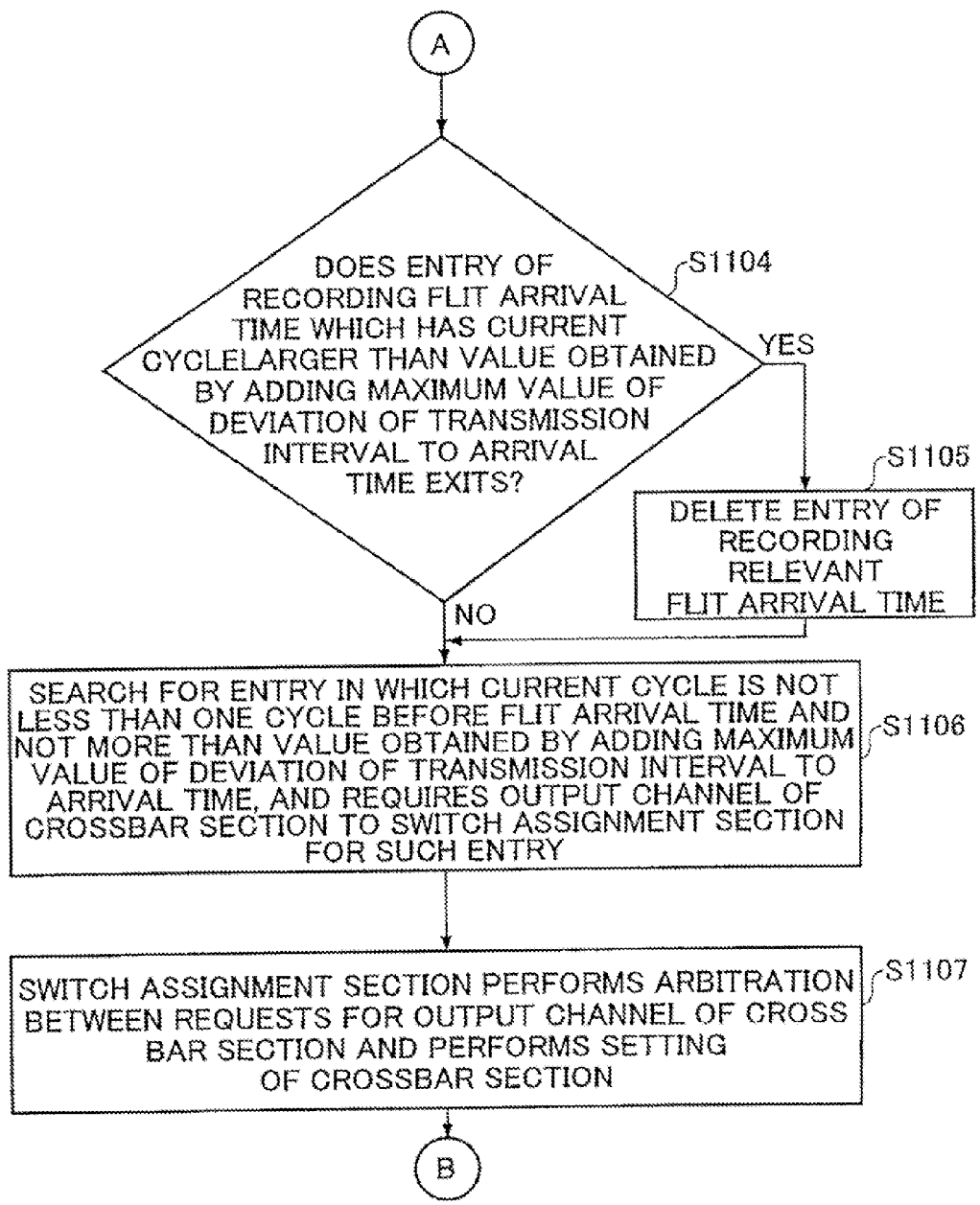
{FIG. 9} A flowchart illustrating an example of processing performed in a router and an IP according to the first exemplary embodiment of the present invention.
Figure 10:
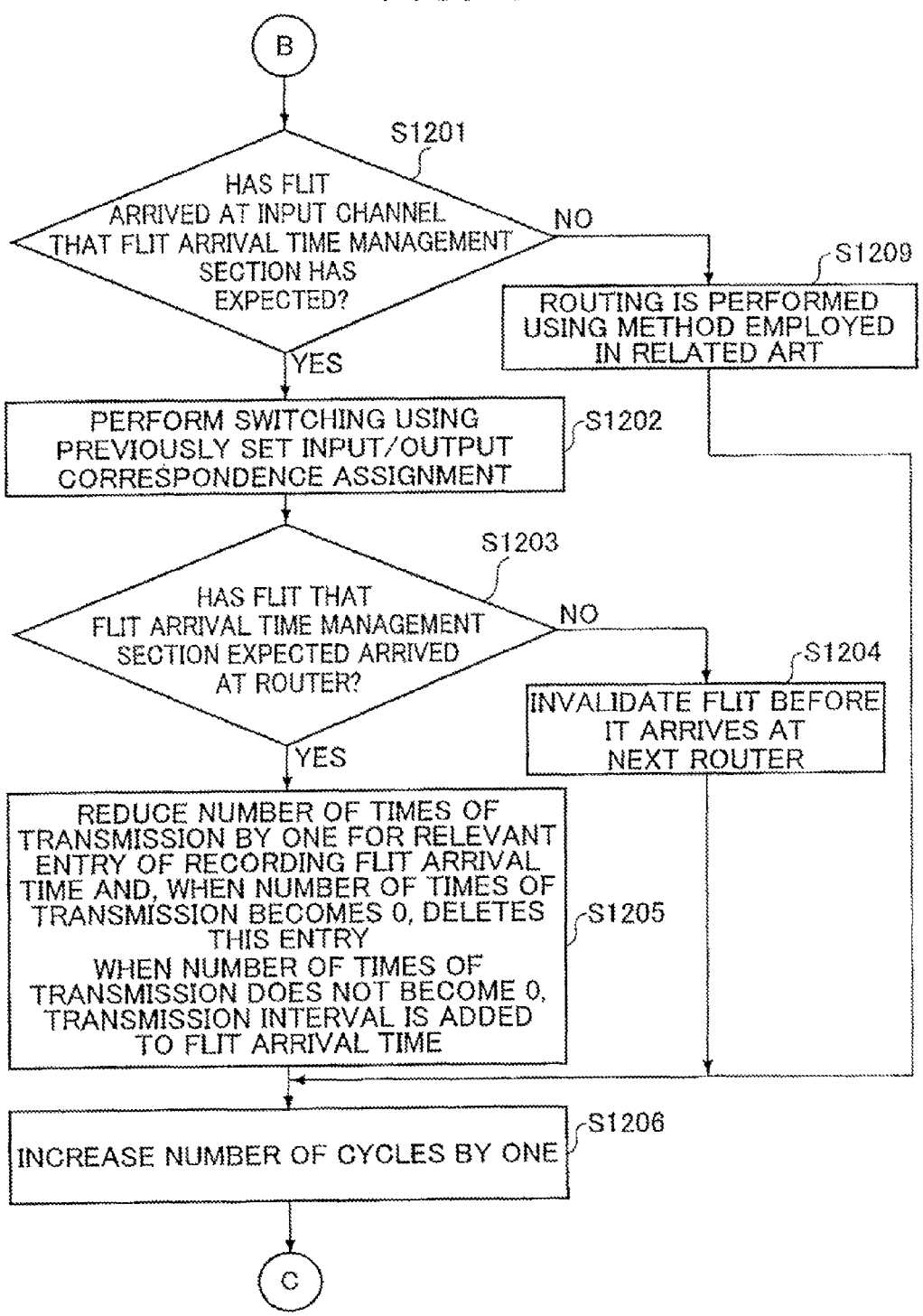
{FIG. 10} A flowchart illustrating an example of processing performed in a router and an IP according to the first exemplary embodiment of the present invention.

Next, operation for the packet transmission at a fixed interval in the router according to the first exemplary embodiment will be described with reference to FIG. 7 and FIGS. 8 to 10. FIGS. 8 to 10 are each a flowchart illustrating an example of processing performed in the router according to the first exemplary embodiment of the present invention.

First, it is assumed that the 1P section 512 connected to the router transmits packets at a fixed time interval to another IP section 512 of a given destination. As illustrated in FIG. 8, the IP section 512 records information concerning the packet transmission including destination, transmission start time, number of times of transmission, interval of transmission, maximum value of deviation of the interval in the control packet as control packet information and inputs the control packet to the input port section 502 through the control packet input section 513 (step S1101).

The transmission start time may be obtained by counting the time at which the IP section 512 starts the packet transmission by the number of cycles. The destination may be represented by an IP or router number or number sequence of the output channel of the crossbar section 510 for arriving to the IP or router.

In the processing performed in the router, a pipeline stage between the arbitration on the request issued from the input channel 501 or input port section 502 to the output channel of the crossbar section 510 and setting of a connection relationship between the input and output channel of the crossbar section 510 is called Switch Allocation (SA) stage.

Assuming that the time required for a packet to pass through a router in the case where the SA stage cannot be brought forward is Ts and the time required for a packet to pass through a router in the case where the SA stage can be brought forward, i.e., the minimum time required for a packet to pass through a router is Tf, the control packet may be transmitted at the timing more than $(Ts-Tf) \times H$ cycles (where H is the number of hops up to destination) in advance.

The control packet is transmitted from a source IP to a destination IP through a router, and this control packet is used to measure the time elapsed from the time when the packet is originated from the IP section 512 (step S1102). At this time, the control packet is transmitted through the same route as a packet that the IP section 512 transmits later. The time elapsed from the time when the packet is originated from the IP section 512 may be measured by counting the number of cycles or the number of hops.

A router provided on the route receives the control packet, and the flit arrival time management section 503 thereof records the information of the control packet (step S1103). Assuming that the time required for the control packet to pass through the channel is Tp, the information to be recorded includes arrival time obtained by adding $H \times (Tf+Tp)$ to the transmission start time recorded in the flit (H is the number of hops), number of the input channel to which the control packet has been input, the number of the output channel of the crossbar section 510 that allows the control packet to hop to the next router, number of times of transmission of the flit, transmission interval, and maximum value of deviation of the transmission interval.

In step S1104 of FIG. 9, in the case where an entry of recording the flit arrival time which has the current cycle (time) larger than the value obtained by adding the maximum value of deviation of the transmission interval to the arrival time exits (YES), that is, in the case where an entry in which the flit has not yet arrived at the time obtained by adding the maximum value of deviation of the transmission interval to the arrival time exits, the flit arrival time management section 503 deletes the entry of recording the relevant flit arrival time (step S1105). With this configuration, it is possible to delete the entry of the flit that has already been transmitted can be deleted even through the number of times of transmission is unknown. Further, although when the deviation of the arrival time is large, a possibility that an output channel to be given to another packet transmitted at a fixed interval is erroneously given increases, this can be avoided by the operation in steps S1104 and S1105.

The flit arrival time management section 503 searches for an entry in which the current cycle (time) is not less than one cycle before the flit arrival time and not more than the value obtained by adding the maximum value of deviation of the transmission interval to the arrival time and requires the output channel of the crossbar section 510 in the router to the switch assignment section 509 for such an entry (step S1106). Also for the flit which is buffered in the input buffer and for which the SA stage is not brought forward and flit which has arrived at the input channel and for which the SA stage is not brought forward, the output channel of the crossbar section is required.

In the case of congestion of the requests for the output channel of the crossbar section 510, the switch assignment section 509 performs arbitration between the requests and performs setting of a connection relationship between the input and output channels of the crossbar section 510 for the admitted request (step S1107).

At this time, the switch assignment section 509 may use the priority assigned to the flit to arbitrate the requests having the same input port number or requests having the same output channel number. A request that has not been satisfied is made in the next cycle once again.

The flit existing in the input channel or input port also issues the request to the switch assignment section 509. The switch assignment section 509 may handle the request from the flit existing in the input channel or input port and request from the flit arrival time management section 503 in the same manner to perform arbitration on the requests and setting of a connection relationship between the input and output channels. Concretely, the case of congestion of the requests is, e.g., the following state. The control packet is input to one input port of one router from another router, and request for the output channel of the crossbar section 510 is issued to the switch assignment section 509 from the flit arrival time management section 503 connected to the one input port. Meanwhile, the control packet is input to the other input port of the one router from the control packet input section 513 connected to the one router, and request for the output channel of the crossbar section 510 is issued to the switch assignment section 509 from another flit arrival time management section 503 connected to the other input port. In this case, the congestion of the requests for the output channel of the crossbar section 510 occurs, and the switch assignment section 509 performs arbitration on the requests.

Subsequently, in step S1201 of FIG. 10, it is determined whether the flit has arrived at the input channel that the flit arrival time management section 503 has expected. In the case where the flit has arrived at the expected input channel (YES), the flow advances to step S1202. If not (NO), the flow advances to step 1209.

If the flit has not arrived at the expected input channel, the routing is performed using the method employed in the related art as disclosed in NPL 4 (step S1209). Then, the flow advances to step S1206.

The crossbar section 510 performs switching using the previously set input/output correspondence assignment to bring forward the time of the SA stage, and the flit is transmitted to the next router (step S1202). FIG. 3(C illustrates a pipeline stage of the router's task in the related art. In the related art, the tasks of SA and ST are performed. In this case, the stage of the SA is brought forward, so that it is virtually only necessary to perform the ST, thereby reducing the routing time. Note that, by performing the VA stage in the same timing as the SA, the stage of the VA can be brought forward.

In step S1203, the switch assignment verification section 517 determines whether the expected flit has arrived at the router. In the case where the expected flit has arrived at the router (YES), the flow advances to step S1205. If not (NO), the flow advances to step S1204. The determination in step S1203 is made as follows. That is, after the arrival of the flit, the routing calculation section 506 calculates the output channel of the crossbar section 510 from which the flit is to be output and the switch assignment verification section 517 determines "YES" when a result of the calculation coincides with the previously set input/output correspondence assignment of the crossbar section 510.

The switch assignment verification section 517 brings forward the SA stage and, if the flit that is not expected has arrived at the router, invalidates the flit before it arrives at the next router (step S1204). The invalidation may be made in such a manner that the flit is prevented from being output to the channel.

In step S1205, the flit arrival time management section 503 reduces the number of times of transmission by one for the relevant entry and, when the number of times of transmission becomes 0, deletes this entry. When the number of times of transmission does not become 0, the flit arrival time management section 503 adds the transmission interval to the flit arrival time.

The number of cycles is increased by one (step S1206) and, after that, the flow returns to step S1102 of FIG. 8.

Subsequently, with reference to FIG. 11 and FIGS. 8 to 10, a concrete example of the information processing device using the NoC technology, including the router according to the first exemplary embodiment, will be described.

FIG. 11 illustrates a network composed of four IPs. As illustrated in FIG. 11, components each including the IP and router are two-dimensionally arranged. Here, it is assumed that IP 51-1 transmits a packet to IP 51-4 at a time interval of 5 from time 5. It is assumed that each packet passes through routers 52-1, 52-2, and 52-4 in this order. Further, it is assumed that the time Tp required for each packet to pass through the channel is one cycle, the time Ts required for the packet passes through the router under the condition that the SA stage cannot be brought forward is two cycles, and the time Tf required for the packet to pass through the router under the condition that the SA stage can brought forward is one cycle. With the unit of the time represented as cycle in the following description, operation of the present exemplary embodiment will be described in the above conditions.

At time 0, the IP 51-1 sets the content of the control packet such that the destination is IP 51-4, the transmission start time of the packet (flit) transmitted after the transmission of the control packet is 5, time interval is five cycles, the number of times of transmission is 2, the maximum value of deviation of the transmission interval is two cycles. Then, the IP 51-1 transmits the control packet to the IP 51-4 through the control packet input section 513 (step S1101).

At time 0, upon receiving the control packet from the IP 51-1, the router 52-1 sets the internal crossbar such that the IP 51-1 is the input side and router 52-2 is the output side. Since the SA stage cannot be forwarded, the control packet arrives at the router 52-2 at time 3. In order to measure the elapsed time using the control packet, the number 1 of hops from the IP-51-1 is recorded in the control packet (step S1102).

The router 52-1 records the content of the control packet in the flit arrival time management section 503. The content to be recorded is as follows: flit arrival time is 5; input channel is IP 51-1; output channel is router 52-2; number of times of transmission is 2; and maximum value of deviation of the transmission interval is two cycles (step S1103).

At time 0, processing from step S1104 to step S1107 and processing from step 1201 to step S1205 are not performed, and the number of cycles representing time increases to 1 (step S1206).

At time 1, processing from step S1102 to step S1107 and processing from step 1201 to step S1205 are not performed, and the number of cycles representing time increases to 2 (step S1206).

At time 2, processing from step S1102 to step S1107 and processing from step 1201 to step S1205 are not performed, and the number of cycles representing time increases to 3 (step S1206).

At time 3, upon receiving the control packet from the router 52-1, the router 52-2 sets the internal crossbar such that the IP 52-1 is the input side and router 52-4 is the output side. The control packet arrives at the router 52-4 at time 6, so that in order to measure the elapsed time using the control packet, the number 2 of hops from the IP-51-1 is recorded in the control packet (step S1102).

The router 52-2 records the content of the control packet in the flit arrival time management section 503. The content to be recorded is as follows: flit arrival time is 7; input channel is router 52-1; output channel is router 52-4; number of times of transmission is 2; and maximum value of deviation of the transmission interval is two cycles (step S1103).

The flit arrival time is time at which the flit transmitted from the IP 51-1 arrives at the router 52-2, which is obtained by adding a value obtained by multiplying (Tf+Tp) by the number 1 of hops to the start time recorded in the control packet.

At time 3, processing from step S1104 to step S1107 and processing from step 1201 to step S1205 are not performed, and the number of cycles representing time increases to 4 (step S1206).

At time 4, processing from step S1102 to step S1105 are not performed. In the router 52-1, the flit arrival time in one of the entries of the flit arrival time management section 503 is 5 and this is the next cycle, so that the flit arrival time management section 503 requires the switch assignment section 509 to assign the output channel of the crossbar of the router 52-1 connected to the router 52-2 to the input port connected to the IP 51-1 (step S1106).

The switch assignment section 509 performs arbitration on the output channel requests. In this case, only one request is issued, the switch assignment section 509 admits the request. Subsequently, the switch assignment section 509 performs setting of the crossbar section 510. That is, the switch assignment section 509 performs setting such that the output channel connected to the router 52-2 is connected to the input port connected to the IP 51-1 (step S1107). In the case where a plurality of requests compete with each other and a plurality of "advance notice of regular arrival" require the same output channel at the same timing, the switch assignment section 509 arbitrates the requests, and one request loses. In the case where both the packets arrive at the input channel at the same timing, the loser (No in step S1201) is routed through the conventional (about three stages) pipeline stage to be added with extra delay time. The winner stops the output channel request, while the loser continues to issue the output channel request until a corresponding packet arrives at the router (steps S1104, S1106, and S1205).

At time 4, processing from step S1201 to step S1205 are not performed, and the number of cycles representing time increases to 5 (step S1206).

At time 5, processing from step S1102 to step S1107 are not performed.

At time 5, in the case where the IP 51-1 tries to transmit the flit to the IP 51-4, the flit is input to the input channel of the router 52-1 connected to the IP 51-1. In this case, the flit arrives at the input channel that the flit arrival time management section 503 has expected, so that the crossbar section 510 performs switching using the previously set input/output connection relationship (step S1202). That is, the setting of the crossbar section 510 in which the IP 51-1 is the input side and router 52-2 is the output side, which was used in the transmission of preceding control packet, is used.

As a result, the SA stage is brought forward, and the time required for the packet to pass through the router is Tf (=one cycle) and the time required for the packet to pass through the channel is Tp (=one cycle), so that the packet arrives at the router 52-2 at time 7. If the connection setting of the crossbar section 510 has not previously been made, the time required for the packet to pass through the router is Ts (=two cycles) and the time required for the packet to pass through the channel is Tp (=one cycle), so that the packet arrives at the router 52-3 at time 8.

This flit is one that the flit arrival time management section 503 has expected, so that the number of times of transmission of the corresponding entry of the flit arrival time management section 503 is reduced by one and is set to 1. Further, transmission interval of 5 is added to the flit arrival time and the flit arrival time becomes 10 (steps S1203 and S1205).

Here, the number of cycles representing time increases to 6 (step S1206).

At time 6, upon receiving the control packet from the router 52-2, the router 52-4 sets the crossbar section such that the router 52-2 is the input side and IP 51-4 is the output side. Since the control packet arrives at the router adjacent to the IP 51-4 which is the destination, the task is not executed anymore. Further, the router 52-4 records the content of the control packet in the flit arrival time management section 503. The content to be recorded is as follows: flit arrival time is 9; input channel is router 52-2; output channel is IP 51-4; number of times of transmission is 2; and maximum value of deviation of the transmission interval is 2 (step S1103).

The flit arrival time is time at which the flit transmitted from the IP 51-1 arrives at the router 52-4, which is obtained by adding a value obtained by multiplying (Tf+Tp) by the number 2 of hops to the start time recorded in the control packet. FIG. 12 illustrates the items recorded in the flit arrival time management section of each router. The control packet is transmitted through the same route as a packet that the IP section 512 transmits later, so that the input channels and output ports of FIG. 12 coincide with the input channels and output ports at which the respective router receive and transmit the control packet.

At time 6, processing from step S1104 to step S1105 are not performed.

In the router 52-2, the flit arrival time in one of the entries of the flit arrival time management section 503 is 7 and this is the next cycle, so that the flit arrival time management section 503 requires the switch assignment section 509 to assign the output channel of the crossbar section of the router 52-2 connected to the router 52-4 to the input channel connected to the IP 52-1 (step S1106).

The switch assignment section 509 performs arbitration on the output channel requests. In this case, only one request is issued, the switch assignment section 509 admits the request. Subsequently, the switch assignment section 509 performs setting of the crossbar section 510. That is, the switch assignment section 509 performs setting such that the output channel connected to the router 52-4 is connected to the input channel connected to the router 52-1 (step S1107).

At time 6, processing from step S1201 to step S1205 are not performed.

The number of cycles representing time increases to 7 (step S1206).

At time 7, processing from step S1102 to step S1107 are not performed.

At time 7, the flit arrives at the router 52-2. The flit arrives at the input channel that the flit arrival time management section 503 has expected, so that switching is performed using the previously set input/output correspondence assignment (steps S1201 and S1202). Since the SA stage is brought forward, the flit arrives at the router 52-4 at time 9.

This flit is one that the flit arrival time management section 503 has expected, so that the number of times of transmission of the corresponding entry of the flit arrival time management section 503 is reduced by one and is set to 1. Further, transmission interval of 5 is added to the flit arrival time and the flit arrival time becomes 12 (steps S1203 and S1205).

The number of cycles representing time increases to 8 (step S1206).

From then on, the same processing is performed to allow the flit to be directed to the IP 52-4. At time 8, arbitration is performed to set the crossbar section 510 of the router 52-4 such that the router 52-2 is the input side and IP 51-4 is the output side. At time 9, the flit arrives at the router 52-4, and above setting is used to allow the flit to arrive at the IP 52-4 at time 11.

At time 9, arbitration is performed to set the crossbar section 510 of the router 52-1 such that the IP 51-1 is the input side and router 52-2 is the output side. At time 10, the flit is input to the router 52-1 from the IP 51-1 once again, and the flit arrives at the router 52-2 at time 12. At this time, the number of times of transmissions in the entry of the flit arrival time management section 503 of the router 52-1 is reduced to 0, and this entry is deleted.

At time 11, arbitration is performed to set the crossbar section 510 of the router 52-2 such that the router 52-1 is the input side and the router 52-4 is the output side. The flit arrives at the router 52-2 at time 12 and arrives at the router 52-4 at time 14. At this time, the number of times of transmissions in the entry of the flit arrival time management section 503 of the router 52-2 is reduced to 0, and this entry is deleted.

At time 13, arbitration is performed to set the crossbar section 510 of the router 52-4 such that the router 52-2 is the input side and IP 51-4 is the output side. The flit arrives at the router 52-4 at time 14 and arrives at the IP 51-4 at time 16. At this time, the number of times of transmissions in the entry of the flit arrival time management section 503 of the router 52-4 is reduced to 0, and this entry is deleted.

With a sequence of the above operations, two packet transmissions at a fixed interval are ended.

As described above, according to the first exemplary embodiment, routing processing time can be reduced.

The first reason is as follows. In the case where the packet is transmitted at a fixed interval, the control packet to which information required for the input/output correspondence assignment processing of the crossbar section 510 is added is transmitted from a source to a destination and thereby a router on the route is notified of the information required for the input/output correspondence assignment processing (SA), whereby the input/output correspondence assignment processing of the crossbar section 510 can be brought forward. This eliminates the need to perform the input/output correspondence assignment processing after the arrival of the packet.

The second reason is as follows. In the packet transmission at a fixed interval, flit arrival time, input channel, output channel, interval, number of times of transmission, and maximum value of deviation of the interval are recorded in the router and whereby, in the conventional router (e.g., NPL 4) for routing a packet, it is possible to correctly grasp a correspondence between the input and output channels even though the prediction of the output channel that the flit arriving at a given channel requires fails to thereby bring forward the input/output correspondence assignment processing of the crossbar in the router.

Further, according to the concrete example of the first exemplary embodiment, it is possible to suppress an increase in network delay in reducing the routing processing time.

The reason is as follows. The conventional router (e.g., NPL 5) for routing a packet transmits the control packet before transmitting data packet, while in the present invention, when the control packet is once transmitted at the start of the packet transmission at fixed time intervals, information including flit arrival time, input channel, output channel, interval, number of times of transmission, maximum value of deviation of the interval is recorded in the flit arrival time management section 503 of the router. This information is reused a number of times, eliminating the need to transmit the control packet every time the data packet is transmitted, whereby the number of packets input to a network is reduced.

[Second Exemplary Embodiment]

Figure 13:
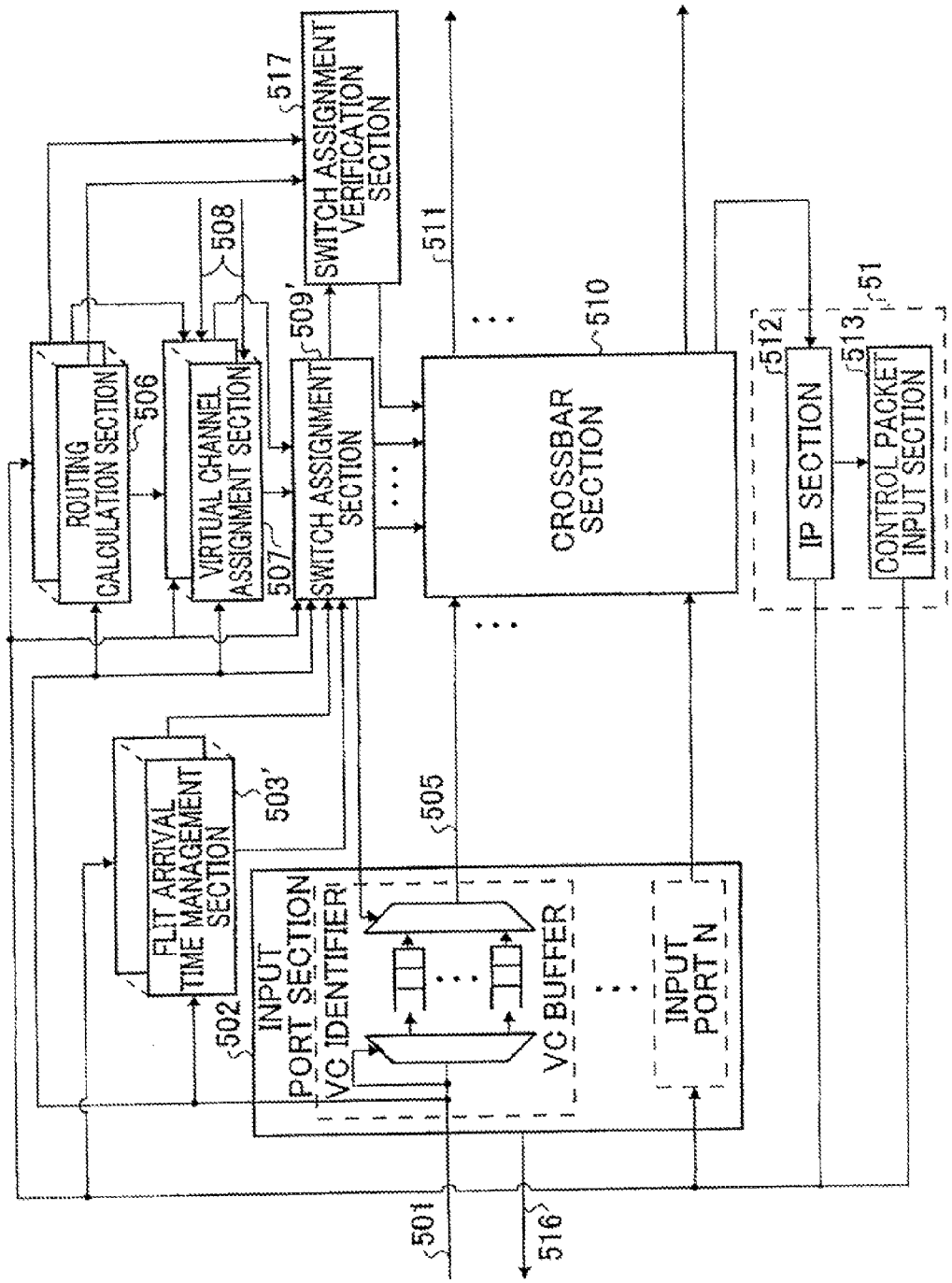
{FIG. 13} A block diagram of a router according to a second exemplary embodiment of the present invention.
Figure 22:
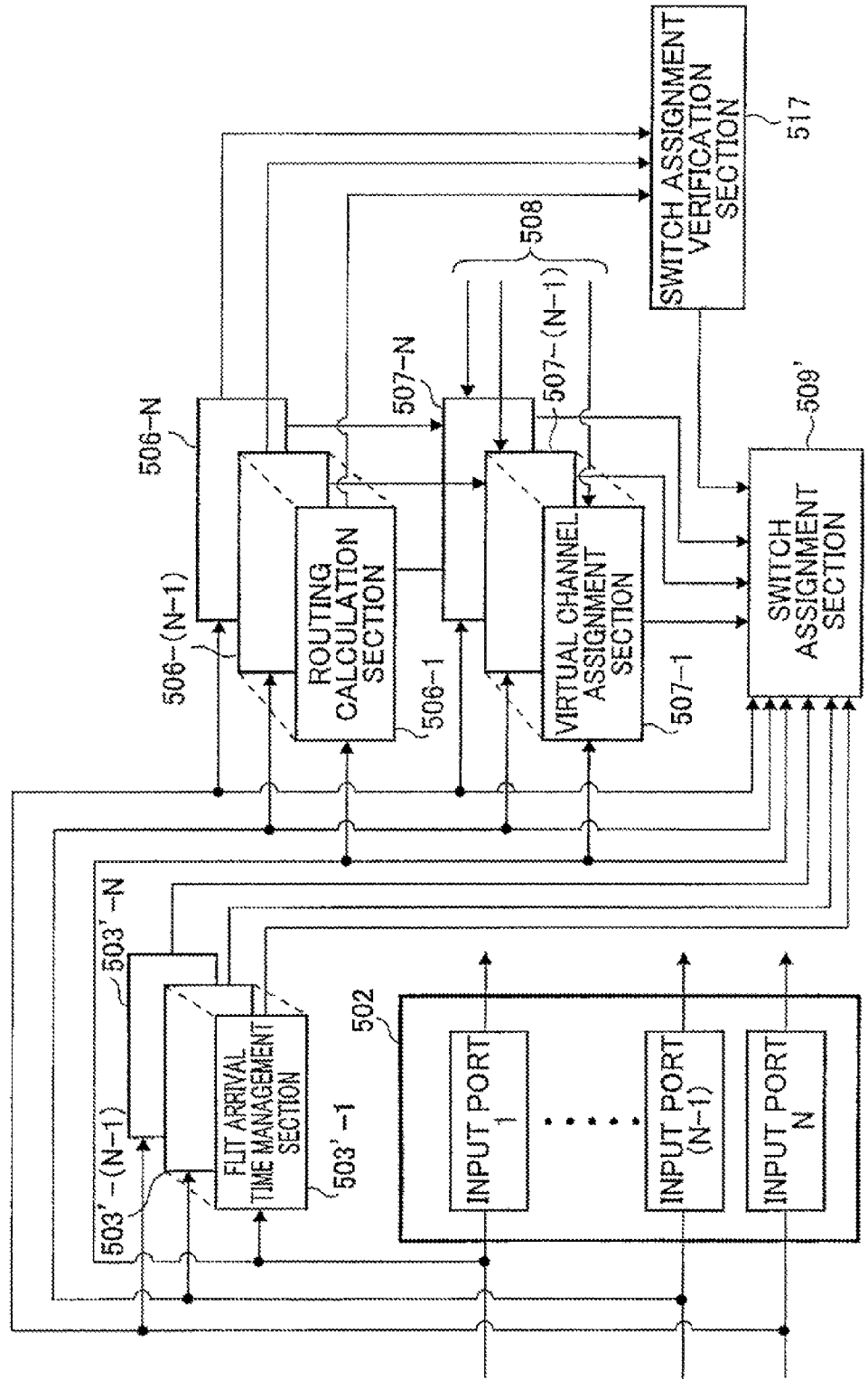
{FIG. 22} A block diagram of a connection relationship between some of the blocks illustrated in FIG. 13.

A second exemplary embodiment of the present invention will be described in detail below with reference to the accompanying drawings. FIG. 13 is a block diagram of a router according to a second exemplary embodiment of the present invention. In FIG. 13, an IP 51 is illustrated in addition to the router. FIG. 22 is a block diagram illustrating a connection relationship between some of the blocks illustrated in FIG. 13. In FIG. 22, flit arrival time management sections 503'-1 to 503'-N correspond to a flit arrival time management section 503' of FIG. 13, routing calculation sections 506-1 to 506-N correspond to a routing calculation section 506 of FIG. 13, virtual channel assignment section 507-1 to 507-N correspond to a virtual channel assignment section 507 of FIG. 13.

Referring to FIG. 13, a router according to the second exemplary embodiment of the present invention has an input channel 501 that receives as an input a packet (flit) from a router as the previous hop, an input port section 502 that buffers the flit, a flit arrival time management section 503', a routing calculation section 506 that determines a router as the next hop for the flit, a virtual channel assignment section 507 that assigns a virtual channel number to the packet, a switch assignment section 509' that performs arbitration between flits in the crossbar in the router and performs setting of a connection relationship between input and output channels, and a crossbar section 510 that connects an input channel and an output channel. The flit arrival time management section 503' records information including flit arrival time, input channel, output channel, interval, number of times of transmission, and maximum value of deviation of the interval on the packet transmission at a fixed interval and requires a plurality of times, to the crossbar section 510 to assign, an output channel from which the packet in the input channel is expected to be output as to an input channel to which the packet is input, before the flit arrival time according to the recorded flit arrival time and interval thereof.

The router according to the second exemplary embodiment of the present invention further has an output channel 511 connected to the next router, an IP section 512 consists mainly of a processor serving as a communicating means, a control packet input section 513 that writes information concerning packet transmission at a fixed interval in a control packet and inputs the resultant control packet to a network, and a switch assignment verification section 517 that verifies whether a connection relationship between the input and output channel of the crossbar section determined by the switch assignment section 509 before arrival of the flit is correct or not.

Figure 18:
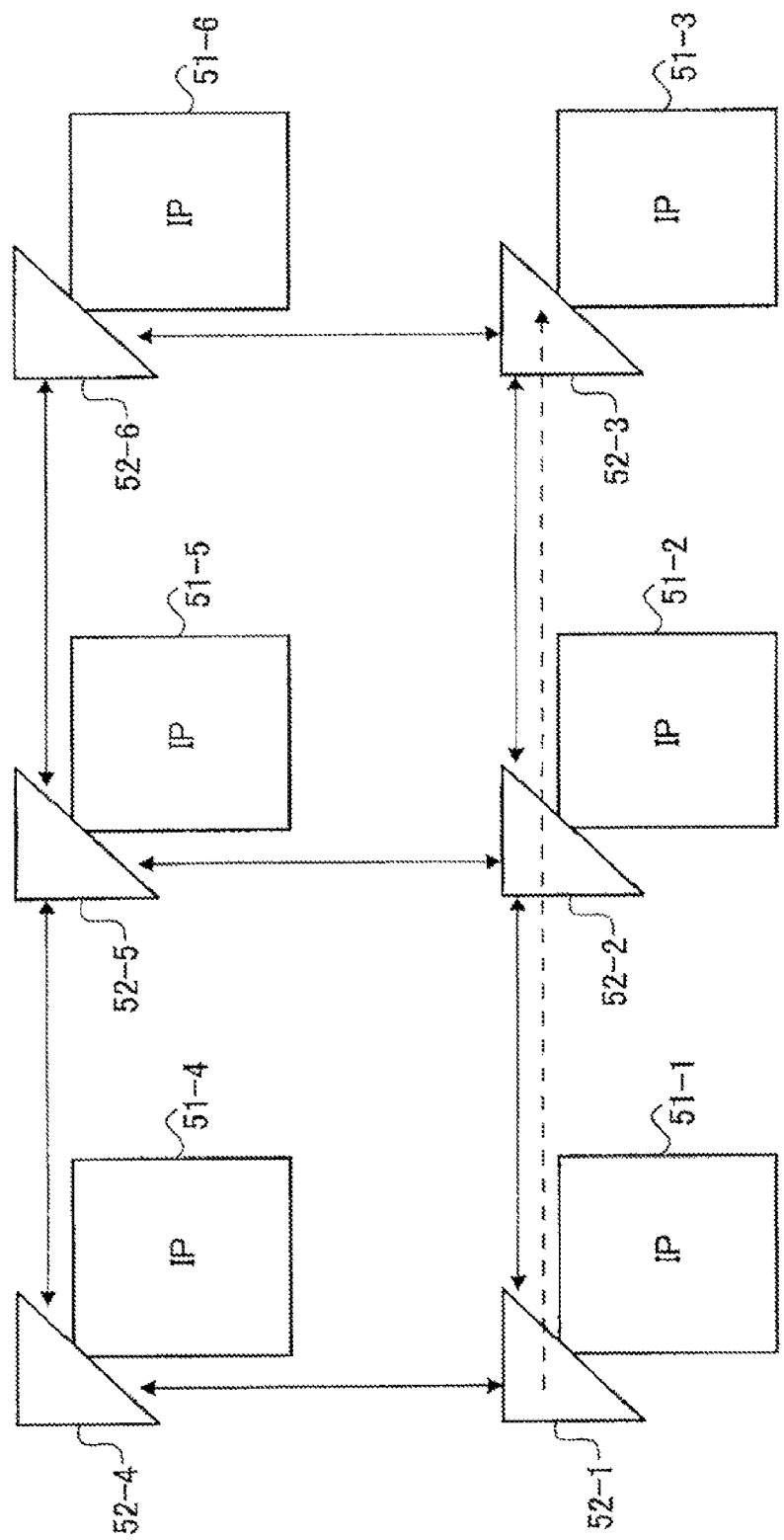
{FIG. 18} A view illustrating an example of "straight" in the packet routing.
Figure 19:
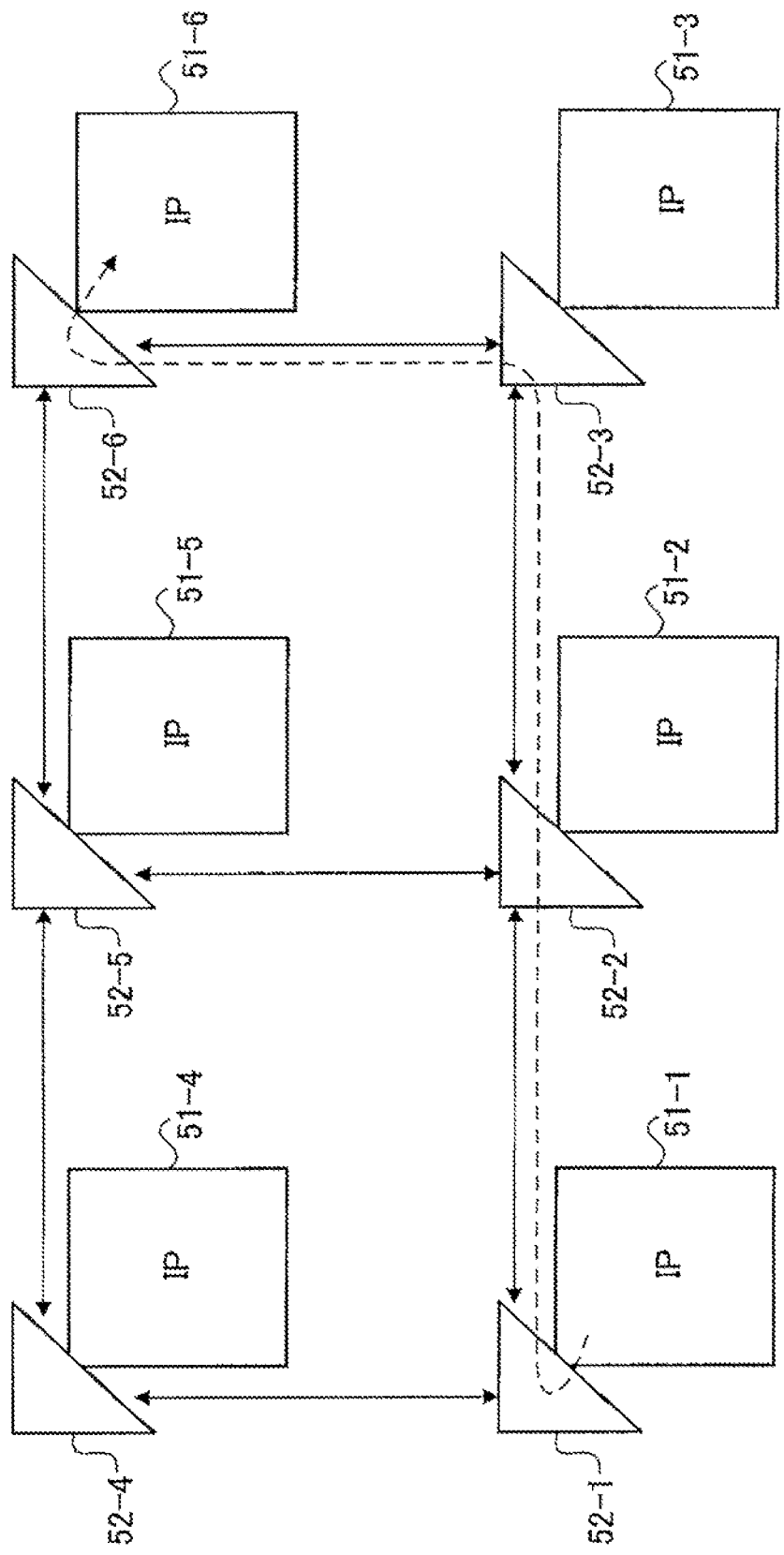
{FIG 19} A view illustrating the routers and a network and the router in a concrete example of the second exemplary embodiment of the present invention.

The IP section 512 and control packet input section 513 constitute the IP 51, and the IP 51 corresponds to each of IPs 51-1 to 51-6 of FIGS. 18 and 19, respectively. Components other than the IP section 512 and control packet input section 513 of FIG. 13 constitute the router, and the router corresponds to each of routers 52-1 to 52-6 of FIG. 13. Each of the flit arrival time management section 503', the routing calculation section 506, and the virtual channel assignment section 507 is provided by the number of input ports. Five input ports are provided in FIGS. 18 and 19, so that five flit arrival time management sections 503', five routing calculation sections 506, and five virtual channel assignment sections 507 are provided. A credit input 508 is input to each of the virtual channel assignment sections 507 provided by the number of input ports, and a credit output 516 is output from the input port section 502.

Referring to FIG. 13, the router according to the second exemplary embodiment of the present invention is a device that performs the following operation. That is, the packet transmission at a fixed interval from the IP section 512, the control packet input section 513 writes information including start time, interval, number of times of transmission, maximum value of deviation of the interval in a control packet and inputs only once the control packet to a network per a plurality of number of times of packet transmission made by the IP section 512.

The flit arrival time management section 503' receives as an input the control packet from the input channel 501 and records information including flit arrival time, input channel, output channel, interval, number of times of transmission, and maximum value of deviation of the interval only when the route is not straight.

That is, a router existing a location at which the route is curved receives the control packet and records information including flit arrival time, input channel, output channel, interval, number of times of transmission, and maximum value of deviation of the interval.

The flit arrival time management section 503' further requires a plurality of times, the crossbar section 510, an output channel from which the flit input to the input channel is expected to be output before the flit arrival time according to the recorded flit arrival time and interval thereof.

The switch assignment section 509' performs arbitration on the requests and then performs input/output connection relationship setting processing of the crossbar section 510 based on a result of the arbitration before the flit arrival time.

As to the input channel that does not require the output channel, the switch assignment section 509' sets the output channel for the input channel such that the route goes straight with respect to the router.

The crossbar section 510 performs switching of the flit using a result of previously set input/output correspondence assignment. This brings forward the arbitration for the input channel and input/output connection relationship setting processing to thereby reduce routing time.

The switch assignment verification section 517 verifies whether the result of the previously performed input/output connection relationship setting processing coincides with the routing of the flit that has actually arrived. Further, the router according to the second exemplary embodiment of the present invention performs the following operation with respect to the control packet, packet transmitted at a fixed interval recorded in the control packet, and a packet other than those mentioned above.

The input port section 502 buffers the flit input from the input channel 501.

The routing calculation section 506 calculates the next router for the input flit.

The virtual channel assignment section 507 determines the virtual channel number to be assigned to the input packet.

The switch assignment section 509' performs arbitration between the output channel requests for the input channel of the crossbar section 510 and setting a connection relationship between the input and output channels.

The crossbar section 510 sends the flit to an appropriate output channel 511.

Next, operation for the packet transmission at a fixed interval in the router according to the second exemplary embodiment will be described with reference to FIG. 13 and FIGS. 14 to 17. FIGS. 14 to 17 are each a flowchart illustrating an example of processing performed in the router according to the second exemplary embodiment of the present invention.

First, it is assumed that the IP section 512 connected to the router transmits a packet at a fixed time interval to another IP section 512 of a given destination. The IP section 512 records destination of the packet transmission, transmission start time, number of times of transmission, interval of transmission, and maximum value of deviation of the interval in the control packet and inputs the control packet to the input port section 502 through the control packet input section 513 (step S1401).

The transmission start time may be obtained by counting the time at which the IP section 512 starts the packet transmission by the number of cycles. The destination may be represented by an IP number or a router number, or number sequence of the output channel of the crossbar section 510 for arriving to the IP or router.

In the processing performed in the router, a pipeline stage between the arbitration on the request issued from the input channel 501 or input port section 502 to the output channel of the crossbar section 510 and setting of a connection relationship between the input port and output channel of the crossbar section 510 is called Switch Allocation (SA) stage.

Assuming that the time required for a packet to pass through a router in the case where the SA stage cannot be brought forward is Ts and the time required for a packet to pass through a router in the case where the SA stage can be brought forward is Tf, the control packet may be transmitted at the timing more than (Ts−Tf)×H cycles (where H is the number of hops up to destination) in advance.

The control packet is transmitted from a source IP to a destination IP through a router, and this control packet is used to measure the time elapsed from the time when the packet is originated from the IP section 512 (step S1402). At this time, the control packet is transmitted through the same route as a packet that the IP section 512 transmits later. The time elapsed from the time when the packet is originated from the IP section 512 may be measured by counting the number of cycles or the number of hops.

A router provided in the middle of the route receives the control packet, and the flit arrival time management section 503 thereof records the information of the control packet in the case where a route as the next hop is not straight with respect to the input channel (step S1403). The "straight" mentioned here means that the coordinate values in a coordinate system assigned to the routers, such as a mesh or a torus network, differ from each other only in one dimension.

FIG. 18 illustrates an example of the "straight". In this example, the route indicated by a broken line is straight with respect to the router 52-2.

In step S1403, assuming that the time required for the control packet to pass through the channel is Tp, the information to be recorded includes arrival time obtained by adding H×(Tf+Tp) to the transmission start time recorded in the flit (H is the number of hops), number of the input channel to which the control packet has been input, the number of the output channel corresponding to a router as the next hop of the control packet, number of times of transmission recorded in the flit, transmission interval, and maximum value of deviation of the transmission interval.

Processing from steps S1404 to S1406 are the same as processing from steps S1104 to S1106 in the first exemplary embodiment, and descriptions thereof will be omitted.

The switch assignment section 509' performs arbitration on the output channel requests for the crossbar section 510. Then, as to the output channel for which the request has been made, the switch assignment section 509' performs setting of a connection relationship between the input port and output channel of the crossbar section 510 based on a result of the arbitration. As to the output channel for which the request has not been made, the switch assignment section 509' sets a connection relationship between input port and the output channel such that the route goes straight with respect to the router (step S1407).

At this time, the switch assignment section 509' may use the priority assigned to the flit to arbitrate the requests having the same input port number or requests having the same output channel number. A request that has not been satisfied is made in the next cycle once again.

Subsequently, in step S1501 of FIG. 18, it is determined whether the flit has arrived at the input channel that the flit arrival time management section 503 has expected. In the case where the flit has arrived at the expected input channel, the flow advances to step S1502. If not (NO), the flow advances to step S1509.

If the flit has not arrived at the expected input channel, the routing is performed using the method employed in the related art as disclosed in NPL 4 (step S1509). Then, the flow advances to step S1506.

Figure 1:
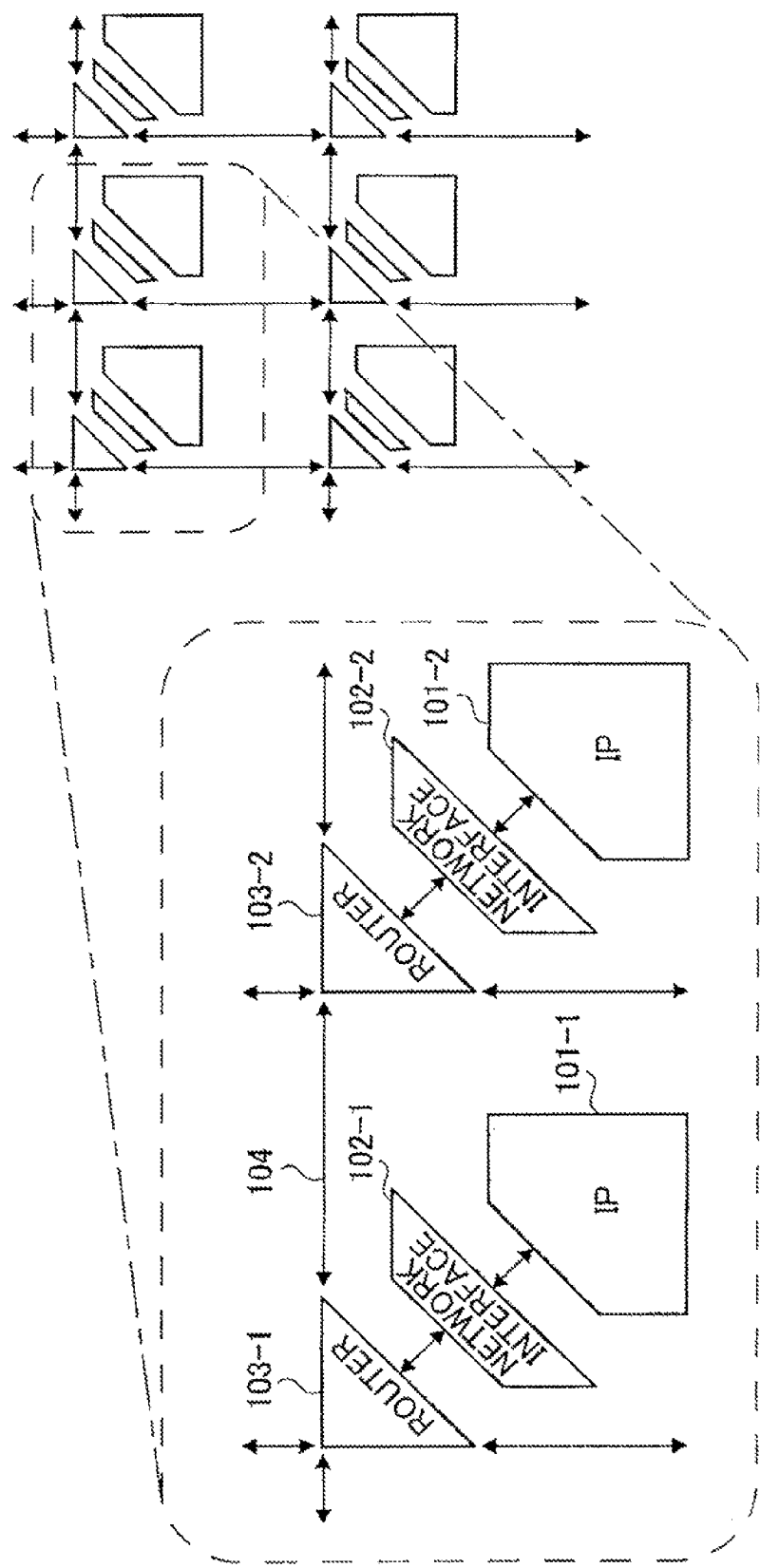
{FIG. 1} A view illustrating an example of an information processing device using a Network on Chip (NoC) technology.
Figure 2:
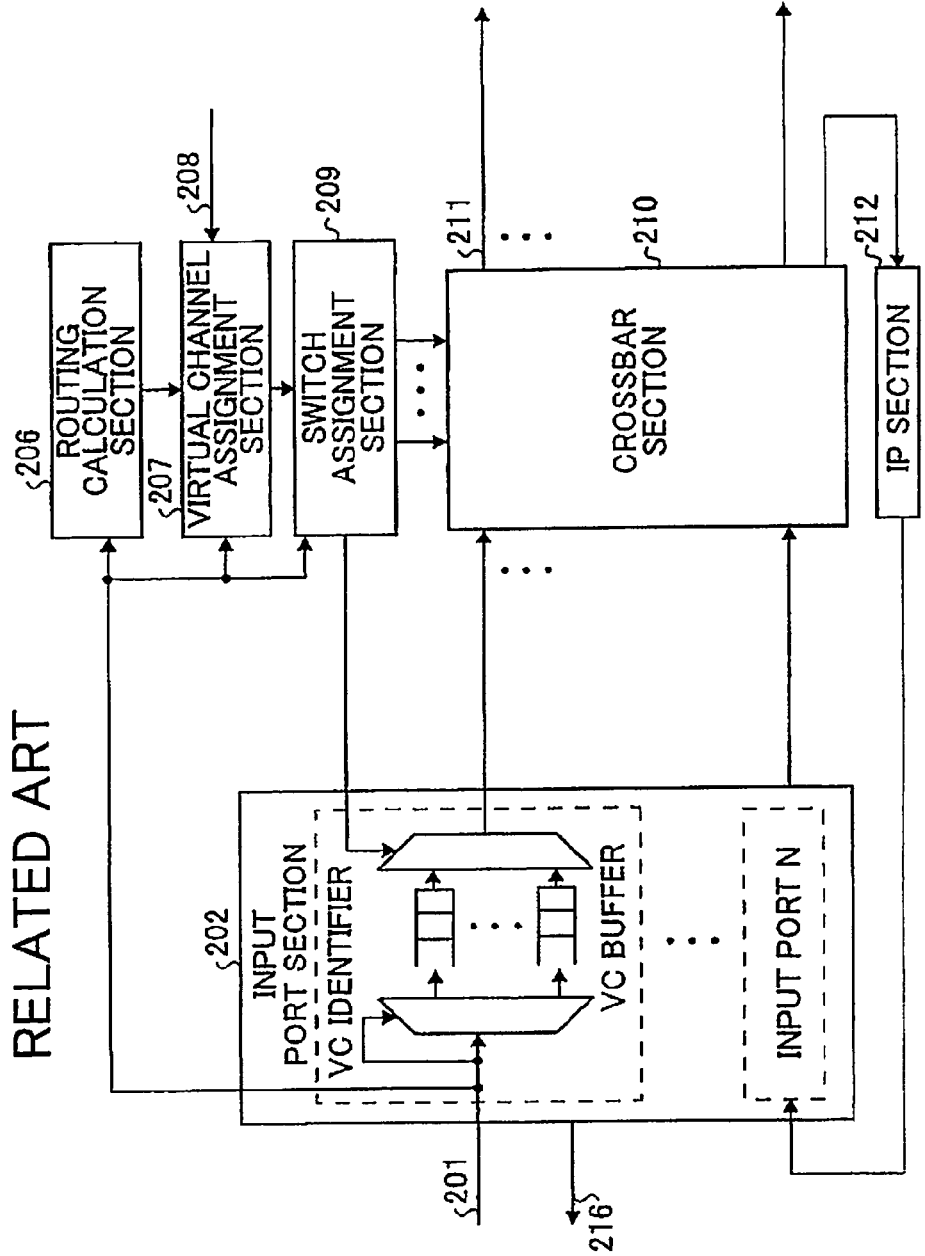
{FIG. 2} A block diagram of a router of related art.
Figure 3A:
{FIGS. 3A to 3D} Views illustrating configurations of pipeline stages of routers according to the present invention and of related art.
Figure 3B:
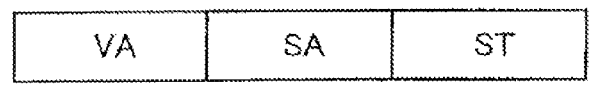
Figure 3C:
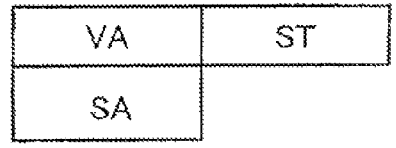
Figure 3D:
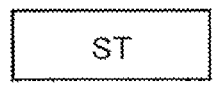
Figure 4:
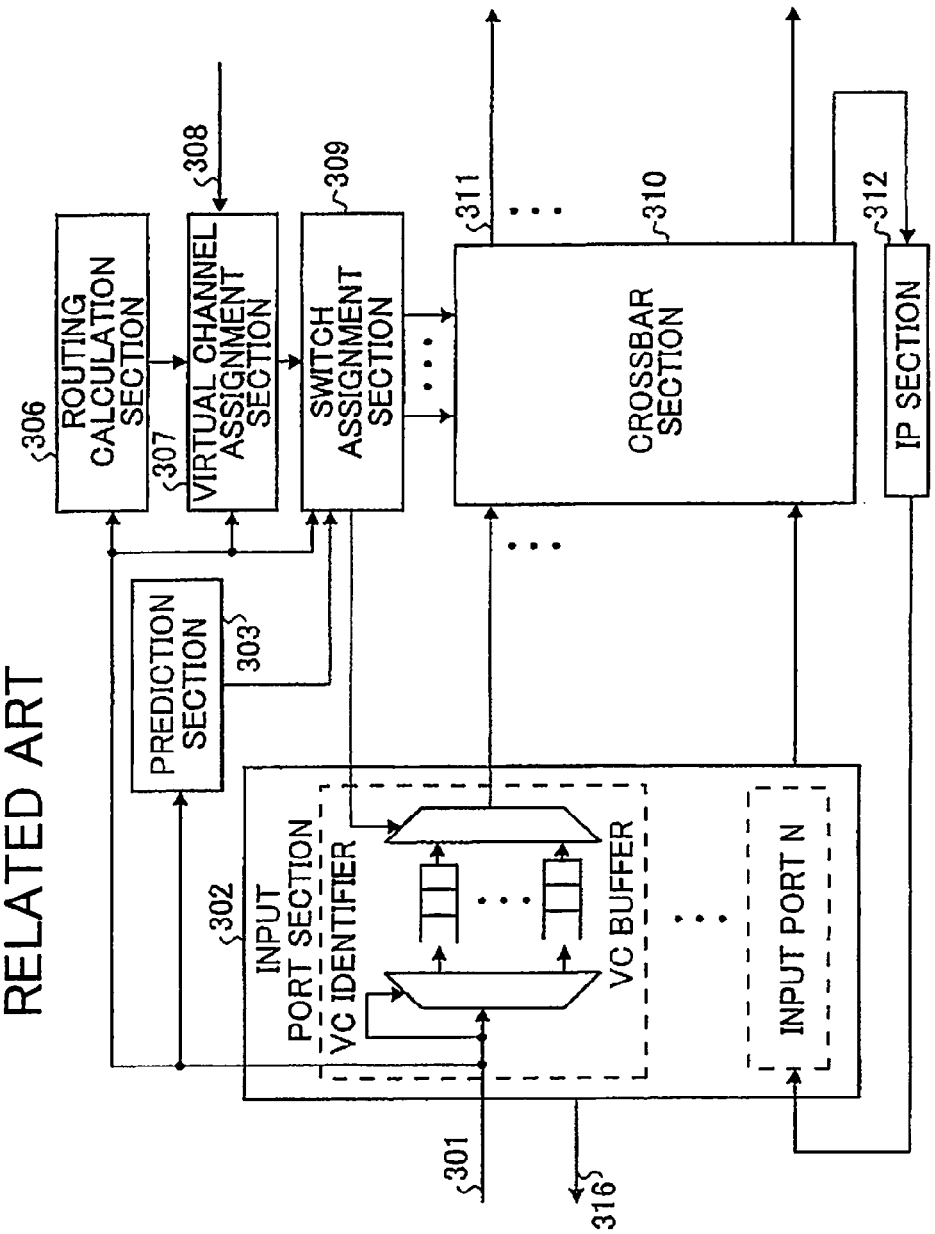
{FIG. 4} A block diagram of a router of related art.
Figure 5:
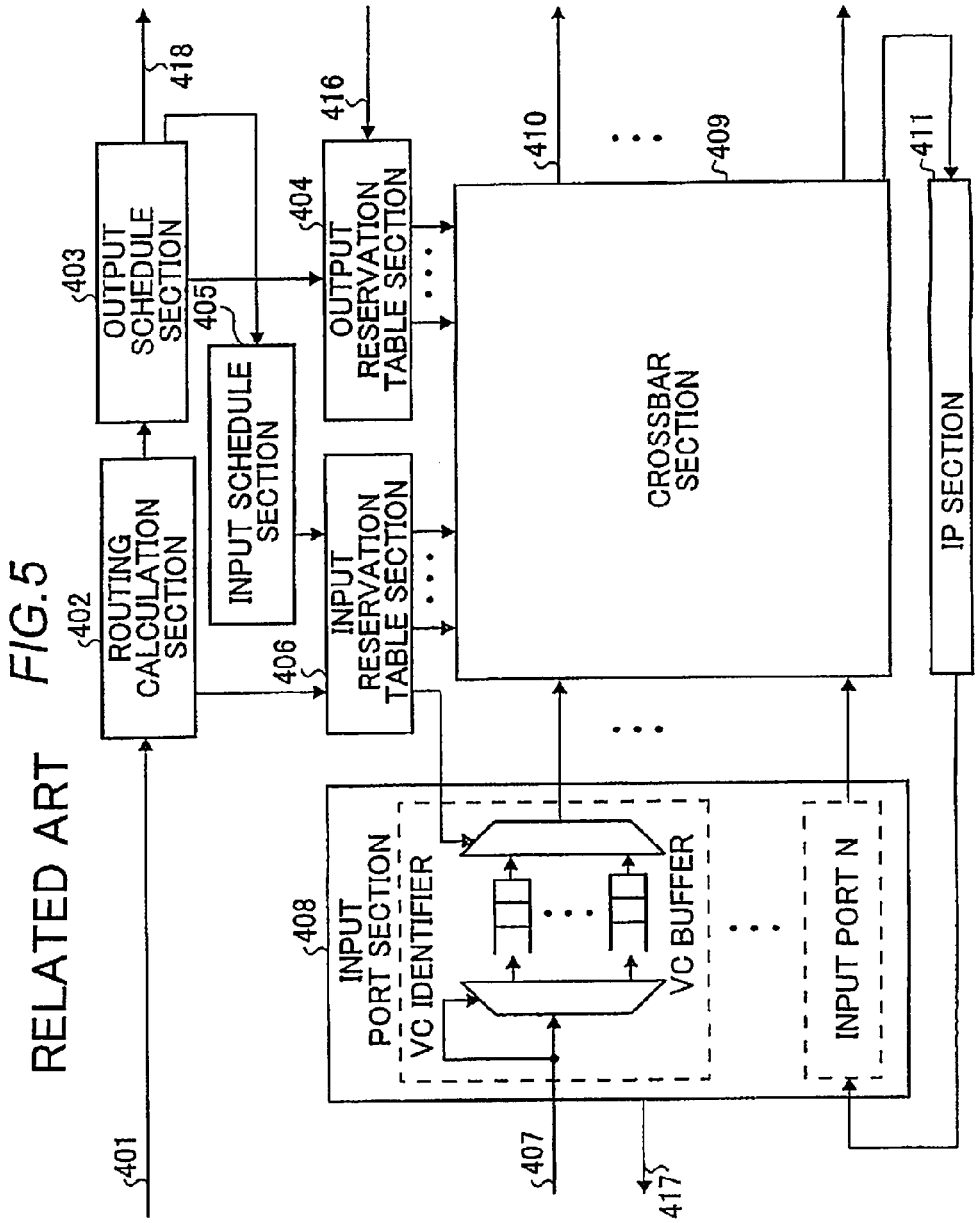
{FIG. 5} A block diagram of a router of related art.

The crossbar section 510 performs switching using the previously set input/output correspondence assignment to bring forward the time of the SA stage, and the flit is transmitted to the next router (step S1502). FIG. 3C illustrates a pipeline stage of the router's task in the related art. In the related art, the tasks of SA and ST are performed. In this case, the stage of the SA is brought forward, so that it is virtually only necessary to perform the ST stage, thereby reducing the routing time. Note that, by performing the VA stage in the same timing as the SA stage, the stage of the VA can be brought forward.

In step S1503, the switch assignment verification section 517 determines whether the expected flit has arrived at the router. In the case where the expected flit has arrived at the router (YES), the flow advances to step S1505. If not (NO), the flow advances to step S1506. The determination in step S1503 is made as follows. That is, after the arrival of the flit, the routing calculation section 506 calculates the output channel of the crossbar section 510 from which the flit is to be output and the switch assignment verification section 517 determines "YES" when a result of the calculation corresponds with the previously set input/output correspondence assignment of the crossbar section 510.

The flit arrival time management section 503' reduces the number of times of transmission by one for the relevant entry and, when the number of times of transmission becomes 0, deletes this entry. When the number of times of transmission does not become 0, the flit arrival time management section 503' adds the transmission interval to the flit arrival time (step S1505).

In step S1506, the switch assignment verification section 517 determines whether both the switch assignment made by the flit arrival time management section 503' and switch assignment made so as to allow the input channels are connected straight with respect to the router are correct or not. In the case where both the switch assignment are correct (YES), the flow advances to step S1508. If not (NO), the flow advances to step S1507. The determination in step S1506 is made as follows. That is, after the arrival of the flit, the routing calculation section 506 calculates the output channel of the crossbar section 510 from which the flit is to be output and the switch assignment verification section 517 determines "YES" when a result of the calculation corresponds with the previously set input/output correspondence assignment of the crossbar section 510.

In the case of NO in the determination of S1506, the switch assignment verification section 517 invalidates the flit before it arrives at the next router (step S1507). The invalidation may be made in such a manner that the flit is prevented from being output to the channel.

Figure 14:
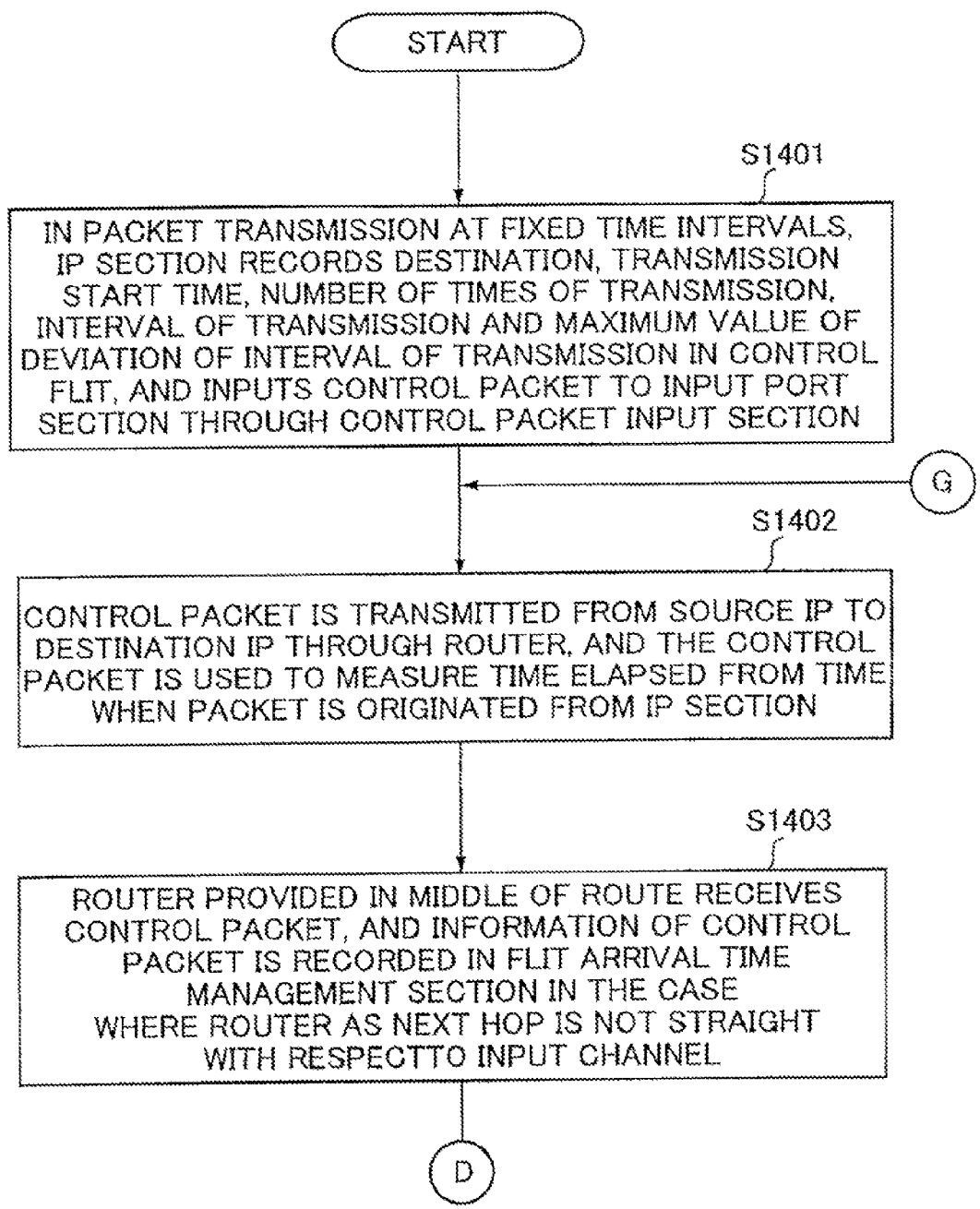
{FIG. 14} A flowchart illustrating an example of processing performed in a router and an IP according to the second exemplary embodiment of the present invention.
Figure 15:
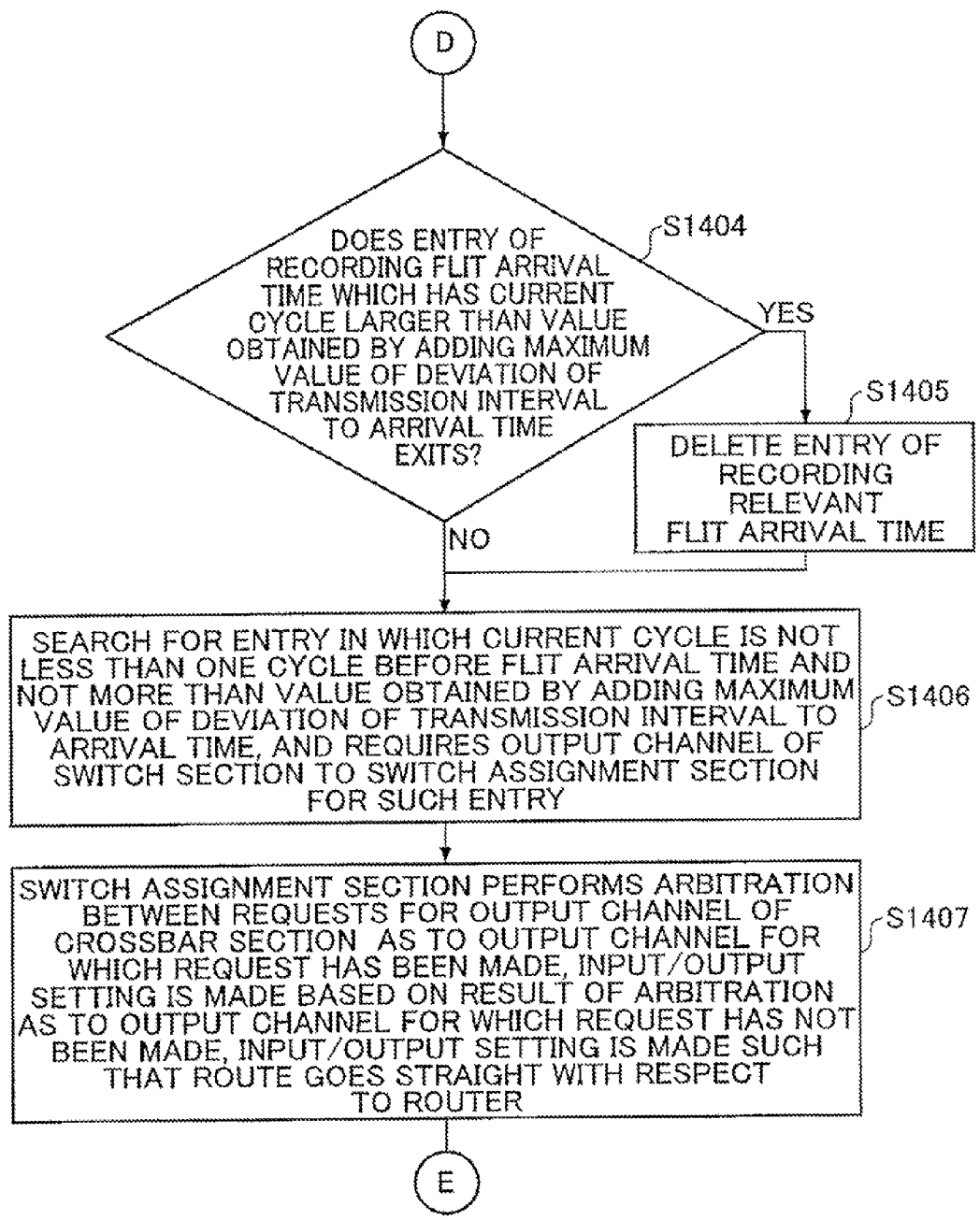
{FIG. 15} A flowchart illustrating an example of processing performed in a router and an IP according to the second exemplary embodiment of the present invention.
Figure 16:
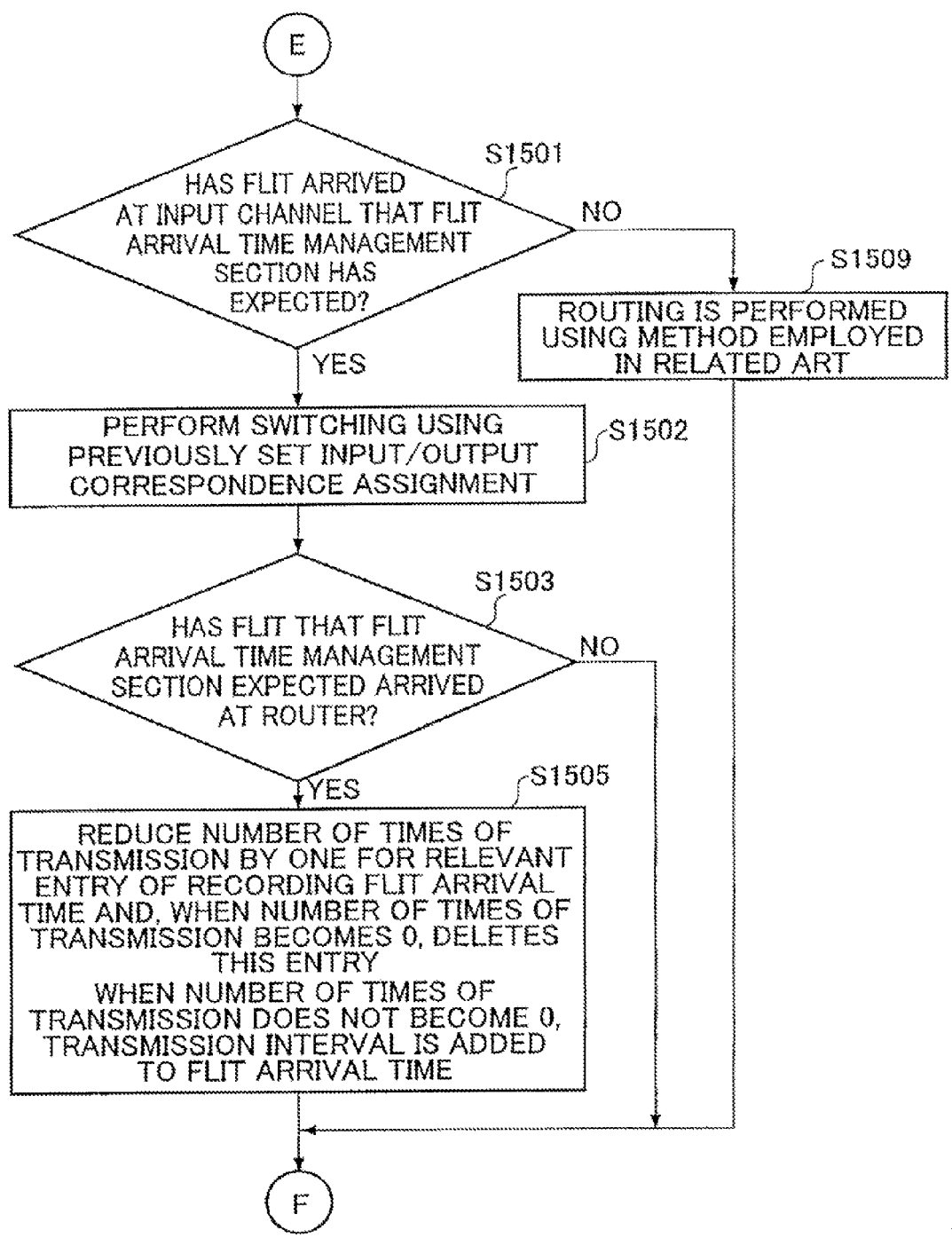
{FIG. 16} A flowchart illustrating an example of processing performed in a router and an IP according to the second exemplary embodiment of the present invention.
Figure 17:
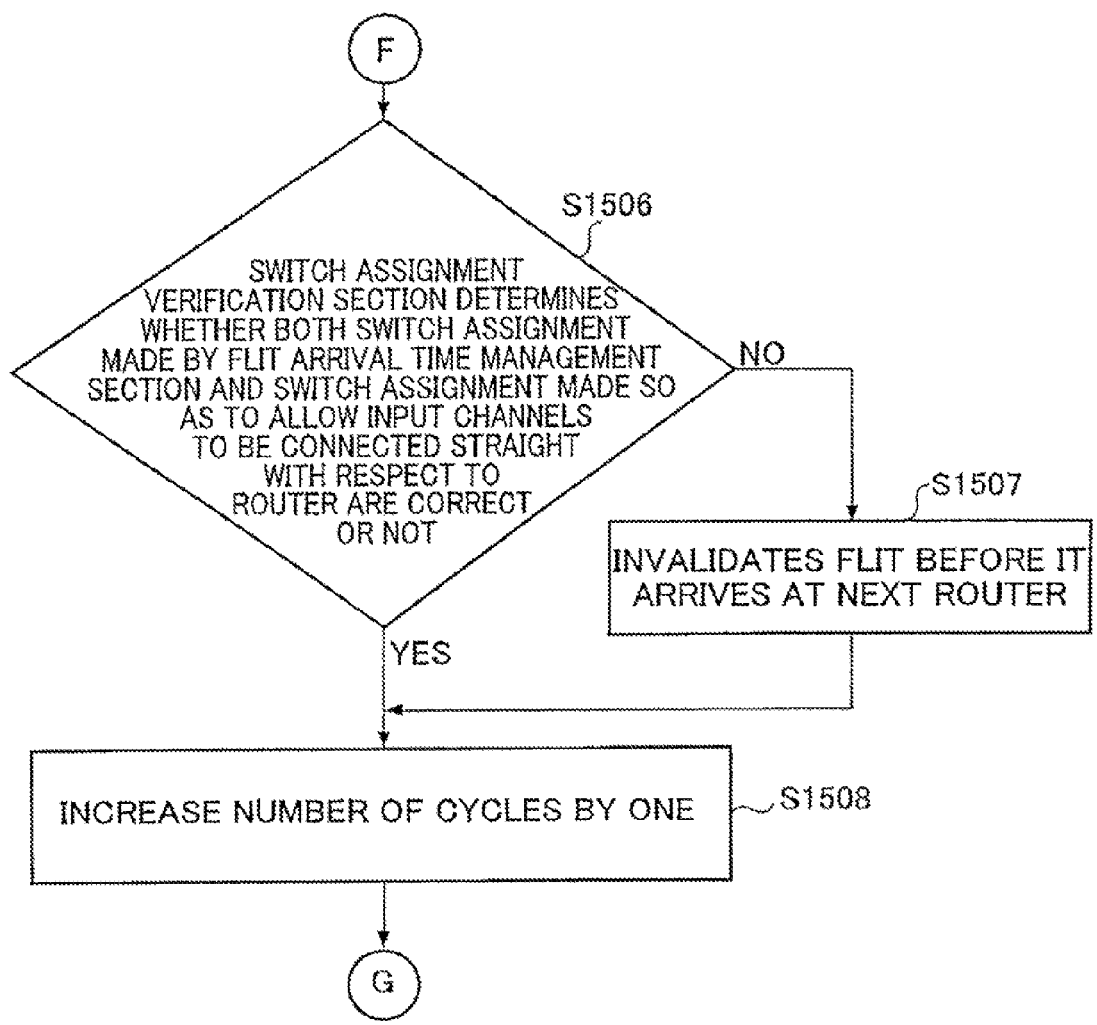
{FIG. 17} A flowchart illustrating an example of processing performed in a router and an IP according to the second exemplary embodiment of the present invention.

The number of cycles is increased by one and, after that, the flow returns to step S1402 of FIG. 14 (step S1508).

Subsequently, with reference to FIG. 19 and FIGS. 14 to 17, a concrete example of the router according to the second exemplary embodiment will be described. As illustrated in FIG. 19, components each including the IP and router are two-dimensionally arranged.

FIG. 19 illustrates a network composed of six IPs. Here, it is assumed that IP 51-1 transmits a packet to IP 51-6 at a time interval of 5 from time 5. It is assumed that each packet passes through routers 52-1, 52-2, 52-3, and 52-6 in this order. Further, it is assumed that the time Tp required for each packet to pass through the channel is one cycle, the time Ts required for the packet passes through the router under the condition that the SA stage cannot be brought forward is two cycles, and the time Tf required for the packet to pass through the router under the condition that the SA stage can brought forward is one cycle. With the unit of the time represented as cycle in the following description, operation of the present exemplary embodiment will be described in the above conditions.

At time 0, the IP 51-1 sets the content of the control packet such that the destination is IP 51-6, the transmission start time is 5, time interval is five cycles, the number of times of transmission is 2, the maximum value of deviation of the transmission interval is two cycles. Then, the IP 51-1 transmits the control packet to the IP 51-6 through the control packet input section 513 (step S1401).

At time 0, the control packet arrives at the router 52-1 from the IP 51-1. Since the SA stage cannot be forwarded, the control packet arrives at the router 52-2 at time 3. In order to measure the elapsed time using the control packet, the number 1 of hops from the IP-51-1 is recorded in the control packet (step S1402).

The router 52-1 records the content of the control packet in the flit arrival time management section 503'. The content to be recorded is as follows: flit arrival time is 5; input channel is IP 51-1; output channel is router 52-2; number of times of transmission is 2; and maximum value of deviation of the transmission interval is two cycles (step S1403).

At time 0, processing from step S1404 to step S1407 and processing from step 1501 to step S1505 are not performed, and the number of cycles representing time increases to 1 (step S1508).

At time 1, processing from step S1402 to step S1407 and processing from step 1501 to step S1507 are not performed, and the number of cycles representing time increases to 2 (step S1508).

At time 2, processing from step S1402 to step S1407 and processing from step 1501 to step S1507 are not performed, and the number of cycles representing time increases to 3 (step S1508).

At time 3, the control packet arrives at the router 52-2 from the router 52-1. The control packet arrives at the router 52-4 at time 6. In order to measure the elapsed time using the control packet, the number 2 of hops from the IP-51-1 is recorded in the control packet (step S1402).

The control packet goes straight with respect to the router 52-2, that is, the control packet arrives at the router 52-1 and goes to the router 52-3, so that the content of the control packet is not recorded in the flit arrival time management section 503' (step S1403).

At time 3, processing from step S1404 to step S1407 and processing from step 1501 to step S1507 are not performed, and the number of cycles representing time increases to 4 (step S1508).

At time 4, processing from step S1402 to step S1405 are not performed. In the router 52-1, the flit arrival time in one of the entries of the flit arrival time management section 503' is 5 and this is the next cycle, so that the flit arrival time management section 503' requires the switch assignment section 509 to assign the output channel of the crossbar section 510 of the router 52-1 connected to the router 52-2 to the input port connected to the IP 51-1 (step S1406).

The switch assignment section 509 performs arbitration on the output channel requests. In this case, only one request is issued, the switch assignment section 509 admits the request. Subsequently, the switch assignment section 509 performs setting of the crossbar section 510. That is, the switch assignment section 509 performs setting such that the output channel connected to the router 52-2 is connected to the input port connected to the IP 51-1 (step S1407).

At time 4, processing from step S1501 to step S1507 are not performed, and the number of cycles representing time increases to 5 (step S1508).

At time 5, processing from step S1402 to step S1407 are not performed.

At time 5, in the case where the IP 51-1 tries to transmits the flit to the IP 51-6, the flit is input to the input channel of the router 52-1 connected to the IP 51-1. In this case, the flit arrives at the input channel that the flit arrival time management section 503' has expected, so that the crossbar section 510 performs switching using the previously set input/output connection relationship (step S1502). That is, the setting of the crossbar section 510 in which the IP 51-1 is the input side and router 52-2 is the output side, which was used in the transmission of preceding control packet, is used.

As a result, the SA stage is brought forward, and the time required for the packet to pass through the router is Tf (=one cycle) and the time required for the packet to pass through the channel is Tp (=one cycle), so that the packet arrives at the router 52-2 at time 7. If the connection setting of the crossbar section 510 has not previously been made, the time required for the packet to pass through the router is Ts (=two cycles) and the time required for the packet to pass through the channel is Tp (=one cycle), so that the packet arrives at the router 52-3 at time 8.

This flit is one that the flit arrival time management section 503' has expected, so that the number of times of transmission of the corresponding entry of the flit arrival time management section 503' is reduced by one and is set to 1. Further, transmission interval of 5 is added to the flit arrival time and the flit arrival time becomes 10 (steps S1503 and S1505).

The flit is one that the flit arrival time management section 503' has expected, which means that the switch assignment made by the flit arrival time management section 503' is correct, so the number of cycles representing time increases to 6 (steps S1506 and S1508).

At time 6, the control packet arrives at the router 52-3 from the router 52-2. The router 52-3 records the content of the control packet in the flit arrival time management section 503'. The content to be recorded is as follows: flit arrival time is 9; input channel is router 52-2; output channel is router 52-6; number of times of transmission is 2; and maximum value of deviation of the transmission interval is 2 (step S1403).

The flit arrival time is time at which the flit transmitted from the IP 51-1 arrives at the router 52-3, which is obtained by adding a value obtained by multiplying (Tf+Tp) by the number 2 of hops to the start time recorded in the control packet.

At time 6, processing from step S1404 to step S1405 are not performed.

In the router 52-2, the flit arrival time management section 503' does not require the switch assignment section 509 for the output channel (step 1406). Thus, the switch assignment section 509 performs setting such that the output channel connected to the router 52-3 is connected to the input channel connected to the router 52-1 (step S1407).

At time 6, processing from step S1501 to step S1507 are not performed.

Here, the number of cycles from the start of the transmission increases to 7 (step S1508).

At time 7, processing from step S1402 to step S1407 are not performed.

At time 7, the flit arrives at the router 52-2. The flit arrives at the input channel that the flit arrival time management section 503' has not expected, so that routing is performed using the method disclosed in the related art (steps S1501 and S1509). The crossbar section 510 is set in the immediately preceding cycle such that the flit goes straight, that is, the flit goes from the router 52-1 to the router 52-3. This is a correct setting for this flit (step S1506). Since the SA stage is brought forward, the flit arrives at the router 52-3 at time 9.

The number of cycles representing time increases to 8 (step S1508).

At time 7, processing from step S1402 to step S1405 are not performed.

In the router 52-3, the flit arrival time in one of the entries of the flit arrival time management section 503' is 9 and this is the next cycle, so that the flit arrival time management section 503' requires, to the switch assignment section 509, to assign the output channel connected to the router 52-6 with respect to the input channel connected to the router 52-2 (step S1406).

The switch assignment section 509 performs arbitration on the output channel requests. In this case, only one request is issued, the switch assignment section 509 admits the request. Subsequently, the switch assignment section 509 performs setting of the crossbar section 510. That is, the switch assignment section 509 performs setting such that the output channel connected to the router 52-6 is connected to the input channel connected to the router 52-2 (step S1407).

At time 8, processing from step S1501 to step S1507 are not performed.

The number of cycles representing time increases to 9 (step S1508).

At time 6, the control packet arrives at the router 52-6 from the router 52-3. Since the control packet arrives at the router adjacent to the IP 51-6 which is the destination, the task is not executed anymore. Further, the router 52-6 records the content of the control packet in the flit arrival time management section 503'. The content to be recorded is as follows: flit arrival time is 11; input channel is router 52-3; output channel is IP 51-6; number of times of transmission is 2; and maximum value of deviation of the transmission interval is 2 (step S1403). The flit arrival time is time at which the flit transmitted from the IP 51-1 arrives at the router 52-6, which is obtained by adding a value obtained by multiplying (Tf+Tp) by the number 3 of hops to the start time recorded in the control packet. FIG. 20 illustrates the items recorded in the flit arrival time management section of each router.

At time 9, step S1404 is No.

At time 9, in the router 52-1, the flit arrival time in one of the entries of the flit arrival time management section 503' is 10 and this is the next cycle, so that arbitration is performed to set the crossbar section 510 of the router 52-1 such that the IP 51-1 is the input side and router 52-2 is the output side (steps S1406 and S1407). This corresponds to the second transmission from the IP 51-1.

At time 9, the flit arrives at the router 52-3. The flit arrives at the input channel that the flit arrival time management section 503' has expected, so that switching is performed using the previously set input/output correspondence assignment (steps S1501 and S1502). Since the SA stage is brought forward, the flit arrives at the router 52-6 at time 9.

This flit is one that the flit arrival time management section 503' has expected, so that the number of times of transmission of the corresponding entry of the flit arrival time management section 503' of the router 52-3 is reduced by one to 1. Further, transmission interval of 5 is added to the flit arrival time and the flit arrival time becomes 12 (steps S1503 and S1505).

The switch assignment made by the flit arrival time management section 503' of the router 52-3, that is, the assignment from the router 52-2 to the router 52-6 is correct, so that the number of cycles representing time increases to 10 (steps S1506 and S1508).

The subsequent processing will be described with repetitive description being omitted.

At time 10, the flit is input to the router 52-1 from the IP 51-1 once again, and the flit arrives at the router 52-2 at time 12. At this time, the number of times of transmissions in the entry of the flit arrival time management section 503' of the router 52-1 is reduced to 0, and this entry is deleted.

At time 10, arbitration is performed to set the crossbar section 510 of the router 52-6 such that the router 52-3 is the input side and IP 51-6 is the output side. At time 11, the flit arrives at the router 52-6, and the above setting is used to allow the flit to arrive at the IP 51-6 at time 13.

At time 11, arbitration is performed to set the crossbar section 510 of the router 52-2 such that the router 52-1 is the input side and router 52-3 is the output side. It should be noted that this setting is not made by the flit arrival time management section 503' but the route is set as a straight line due to absence of the output channel request. The flit arrives at the router 52-2 at time 12 and then arrives the router 52-3 at time 14.

At time 13, arbitration is performed to set the crossbar section 510 of the router 52-3 such that the router 52-2 is the input side and router 52-6 is the output side. The flit arrives at the router 52-3 at time 14 and arrives at the IP 52-6 at time 16. At this time, the number of times of transmissions in the entry of the flit arrival time management section 503' of the router 52-3 is reduced to 0, and this entry is deleted.

At time 15, arbitration is performed to set the crossbar section 510 of the router 52-6 such that the router 52-3 is the input side and IP 51-6 is the output side. The flit arrives at the router 52-6 at time 16 and arrives at the IP 51-6 at time 18. At this time, the number of times of transmissions in the entry of the flit arrival time management section 503' of the router 52-6 is reduced to 0, and this entry is deleted.

With a sequence of the above operations, two packet transmissions at a fixed interval are ended.

In addition to the effect of the first exemplary embodiment, the concrete example of the second exemplary embodiment produces the following effect. That is, the flit arrival time management section of the router 52-2 need not record any data, so that it is possible to reduce the storage capacity of the flit arrival time management section.

As described above, according to the present exemplary embodiment, routing processing time can be reduced.

The first reason is as follows. In the case where the packet is transmitted at a fixed interval, the control packet information required for the input/output correspondence assignment processing of the crossbar in the router is added is transmitted from a source to a destination and thereby a router in the middle of the route is notified of the information required for the input/output correspondence assignment processing, whereby the input/output correspondence assignment processing of the crossbar in the router can be brought forward. This eliminates the need to perform the input/output correspondence assignment processing after the arrival of the packet.

The second reason is as follows. In the packet transmission at a fixed interval, flit arrival time, input channel, output channel, interval, number of times of transmission, and maximum value of deviation of the interval are recorded in the router and whereby, in the conventional router (e.g., NPL 4) for routing a packet, it is possible to correctly grasp a correspondence between the input and output channels even though the prediction of the output channel that the flit arriving at a given input channel requires fails to thereby bring forward the input/output correspondence assignment processing of the crossbar in the router.

Further, according to the present exemplary embodiments, it is possible to suppress an increase in network delay in reducing the routing processing time.

The reason is as follows. The conventional router (e.g., NPL 5) for routing a packet transmits the control packet before transmitting data packet, while in the present invention, when the control packet is once transmitted at the start of the packet transmission at fixed time intervals, information including flit arrival time, input channel, output channel, interval, number of times of transmission, and maximum value of deviation of the interval is recorded in the router. This information is reused a number of times, eliminating the need to transmit the control packet every time the data packet is transmitted, whereby the number of packets input to a network is reduced.

Further, according to the present exemplary embodiment, in order to reduce the routing processing time, when in the packet transmission at fixed time intervals, information including flit arrival time, input channel, output channel, interval, number of times of transmission, and maximum value of deviation of the interval is recorded in the router, the amount of data to be recorded and the number of management sections involved in the recording can be reduced.

The reason is as follows. In the packet transmission at fixed time, information including flit arrival time, input channel, output channel, interval, number of times of transmission, and maximum value of deviation of the interval is not recorded in all the routers on the route but the information is not recorded in the router on the route that goes straight with respect to another router. The flit arrival time management section in the router on the route that goes straight with respect to another router does not operate but instead the switch assignment section plays a role of bringing forward the SA stage.

[Another Exemplary Embodiment]

Although the exemplary embodiments of the present invention have been described, the present invention is not limited to the above exemplary embodiments, and various modifications may be made. For example, in the above exemplary embodiments, the virtual channel assignment section may be omitted.

Although the representative exemplary embodiments of the present invention have been described, it should be understood that the present invention can be practiced in various forms without departing from the sprit and scope of the invention as defined by the appended claims. Thus, the above exemplary embodiments are merely illustrative and should not be considered restrictive in any way. The scope of the present invention is defined by the appended claims and not restricted by the descriptions of the specification and abstract. Further, all variations and modifications which come within the equivalent range of the claims are embraced in the scope of the present invention.

REFERENCE SIGNS LIST

101: IP
102: Network interface
103: Router
104: Channel
201: Input channel
202: Input port section
206: Routing calculation section
207: Virtual channel assignment section
208: Credit input
209: Switch assignment section
210: Crossbar section
211: Output channel
212: IP section
216: Credit output
301: Input channel
302: Input port section
303: Prediction section
306: Routing calculation section
307: Virtual channel assignment section
308: Credit input
309: Switch assignment section
310: Crossbar section
311: Output channel
312: IP section
316: Credit output
401: Control packet input channel
402: Routing calculation section
403: Output schedule section
404: Output reservation table section
405: Input schedule section
406: Input reservation table section
407: Input channel
408: Input port section
409: Crossbar section
410: Output channel
411: IP section
416: Credit input
417: Credit output
418: Control packet output channel
501: Input channel
502: Input port section
503, 503': Flit arrival time management section 506: Routing calculation section
507: Virtual channel assignment section
508: Credit input
509, 509': Switch assignment section
510: Crossbar section
511: Output channel
512: IP section
513: Control packet input section
516: Credit output
517: Switch assignment verification section

The invention claimed is:

1. A router comprising:
an input port section to which packets transmitted a plurality of times at a fixed interval and a control packet transmitted prior to the packets are input from a plurality of input channels;
a crossbar section that connects a plurality of input channels with a plurality of output channels, the plurality of input channels of the crossbar section receiving a plurality of outputs of the input port section;
a flit arrival time management section that requires an output channel a plurality of times to the crossbar section before the flit arrival time, the output channel being an output channel from which the packets are expected to be output;
a switch assignment section that performs, according to the request from the flit arrival time management section, input/output connection relationship setting processing of setting a connection relationship between the input channels and the output channels before the flit arrival time and, if there are a plurality of the requests and congestion of the requests occurs, arbitrates the requests before the flit arrival time for the input/output connection relationship setting processing; and
a switch assignment verification section that verifies whether a result of the input/output connection relationship setting processing corresponds with the actual routing of the packets, wherein
the flit arrival time management section acquires, from the control packet, control packet information including transmission start time of the packets and transmission interval of the packets, calculates flit arrival time which is the time at which a packet in the packets is received based on the control packet information, records the flit arrival time, the transmission interval included in the control packet information, and input and output channels of the control packet, and makes the request a plurality of times based on the recorded information,
the crossbar section performs switching of the arriving packets using a result of the input/output connection relationship processing,
the number of times of transmission of the packets is recorded in the control packet, and
the flit arrival time management section records the number of times of transmission of the packets recorded in the control packet and, when the number of times of arrival of the packets reaches the value of the number of times of transmission of the packets, deletes an entry of recording the flit arrival time recorded in the flit arrival time management section itself.

2. The router according to claim 1, wherein
the flit arrival time management section defines, as the flit arrival time, a value obtained by adding a value obtained by multiplying ((minimum time required for a packet to pass through the router)+(time required for a packet to pass through a channel)) by (the number of routers provided between a transmission source and a transmission destination), to the transmission start time recorded in the control packet.

3. The router according to claim 1, wherein
packets existing in the input channel to the input port section or the input port section require output channels to the crossbar section, and
the switch assignment section arbitrates the requests made by the packets existing in the input channel to the input port section or input port section and requests made by the flit arrival time management section and performs, according to arbitrated requests, input/output connection relationship setting processing of setting a connection relationship between the input channels and the output channels before the flit arrival time.

4. The router according to claim 1, wherein
the maximum value of deviation of the transmission interval of the packets is recorded in the control packet, and
in the case where an entry in which a packet in the packets has not yet arrived at the time obtained by adding the maximum value of deviation of the transmission interval to the arrival time exits among the records of the flit arrival time, the flit arrival time management section deletes the entry.

5. An information processing device using the router as claimed in claim 1, wherein
components are two-dimensionally arranged, each of the components including the router and an Intellectual Property (IP) that transmits the packets and control packet to the router, and
the IP includes: an IP section that transmits the packets a plurality of times at a fixed time interval and records control packet information including transmission start time of the packets and transmission interval of the packets in the control packet; and a control packet input section that transmits the control packet prior to the transmission of the packets.

6. The information processing device according to claim 5, wherein
the flit arrival time management section of a router which is provided on a route connecting the IP as a transmission source of the packets and another IP as a transmission destination of the packets and which curves the route requires an output channel a plurality of times to the crossbar section before the flit arrival time, the output channel being an output channel from which the packets is expected to be output.

7. The router according to claim 1, wherein
the router is arranged on a route from a transmission source of the packets to a transmission destination of the packets, and
in the case where the request from the flit arrival time management section does not require the output channel, the switch assignment section sets the output channel to the input channel such that the route goes straight with respect to the router.

8. The router according to claim 7, wherein
in the case where the output channel is set for the input channel such that the route goes straight with respect to the router, the switch assignment verification section verifies whether the setting corresponds with the actual routing.

9. A router comprising:
an input port section to which packets transmitted a plurality of times at a fixed interval and a control packet transmitted prior to the packets are input from a plurality of input channels;

a crossbar section that connects a plurality of input channels with a plurality of output channels, the plurality of input channels of the crossbar section receiving a plurality of outputs of the input port section;

a flit arrival time management section that requires an output channel a plurality of times to the crossbar section before the flit arrival time, the output channel being an output channel from which the packets are expected to be output;

a switch assignment section that performs, according to the request from the flit arrival time management section, input/output connection relationship setting processing of setting a connection relationship between the input channels and the output channels before the flit arrival time and, if there are a plurality of the requests and congestion of the requests occurs, arbitrates the requests before the flit arrival time for the input/output connection relationship setting processing; and a switch assignment verification section that verifies whether a result of the input/output connection relationship setting processing corresponds with the actual routing of the packets, wherein the flit arrival time management section acquires, from the control packet, control packet information including transmission start time of the packets and transmission interval of the packets, calculates flit arrival time which is the time at which a packet in the packets is received based on the control packet information, records the flit arrival time, the transmission interval included in the control packet information, and input and output channels of the control packet, and makes the request a plurality of times based on the recorded information, the crossbar section performs switching of the arriving packets using a result of the input/output connection relationship processing, and in the case where the minimum time required for one router to complete a given operation is one cycle, the flit arrival time management section determines that a current time is within a time period when a flit might arrive in the next cycle in the case where the current time is from one cycle before the flit arrival time recorded in the control packet and not more than the value obtained by adding the maximum value of deviation of the transmission interval to the flit arrival time recorded in the control packet.

10. The router according to claim 9, wherein the flit arrival time management section defines, as the flit arrival time, a value obtained by adding a value obtained by multiplying ((minimum time required for a packet to pass through the router)+(time required for a packet to pass through a channel)) by (the number of routers provided between a transmission source and a transmission destination), to the transmission start time recorded in the control packet.

11. The router according to claim 9, wherein packets existing in the input channel to the input port section or the input port section require output channels to the crossbar section, and the switch assignment section arbitrates the requests made by the packets existing in the input channel to the input port section or input port section and requests made by the flit arrival time management section and performs, according to arbitrated requests, input/output connection relationship setting processing of setting a connection relationship between the input channels and the output channels before the flit arrival time.

12. The router according to claim 9, wherein the router is arranged on a route from a transmission source of the packets to a transmission destination of the packets, and in the case where the request from the flit arrival time management section does not require the output channel, the switch assignment section sets the output channel to the input channel such that the route goes straight with respect to the router.

13. A packet routing method comprising:

a step of recording, in the case where a transmission source transmits packets a plurality of times at a fixed interval, control packet information including transmission start time of the packets and transmission interval of the packets in a control packet;

a control packet input step of transmitting the control packet prior to the transmission of the packets;

a flit arrival time management step in which in the case where a router exists on a route up to a transmission destination of the packets, the router receives the control packet, acquires control packet information from the received control packet, calculates flit arrival time which is the time at which a packet in the packets is received for the first time based on the control packet information, records the flit arrival time, the transmission interval included in the control packet information, and input and output channels of the control packet, and requires an output channel from which the packets are supposed to be output, to a crossbar section of the router, based on the recorded information before the flit arrival time;

a switch assignment step of performing, according to the request, input/output connection relationship setting processing of setting a connection relationship between the input and output channels before the flit arrival time and, if there are a plurality of the requests and congestion of the requests occurs, arbitrating the requests before the flit arrival time for the input/output connection relationship setting processing;

a step in which the crossbar section performs switching of the arriving packets using a result of the input/output connection relationship processing; and a switch assignment verification step of verifying whether a result of the input/output connection relationship setting processing corresponds with the actual routing of packets, wherein the number of times of transmission of the packets is recorded in the control packet in the control packet input step, and the flit arrival time management step records the number of times of transmission of the packets recorded in the control packet and, when the number of times of arrival of the packets reaches the value of the number of times of transmission of the packets, deletes an entry of recording the flit arrival time recorded in the flit arrival time management step itself

14. The packet routing method according to claim 13, wherein the flit arrival time management step defines, as the flit arrival time, a value obtained by adding a value obtained by multiplying ((minimum time required for a packet to pass through the router)+(time required for a packet to pass through a channel)) by (the number of routers provided between a transmission source and a transmission destination), to the transmission start time recorded in the control packet.

15. The packet routing method according to claim 13, wherein in the case where the minimum time required for one router to complete a given operation is one cycle, the flit arrival time management step determines that the current time is before the flit arrival time in the case where the current time is within one cycle before the flit arrival time and not more than the value obtained by adding the maximum value of deviation of the transmission interval to the flit arrival time.

16. The packet routing method according to claim 13, wherein in the case where packets existing in the input channel to the input port section and the input port section require output channels to the crossbar section, the switch assignment step arbitrates the requests made by the packets existing in the input channel to the input port section and input port and requests made by the flit arrival time management section and performs, according to arbitrated requests, input/output connection relationship setting processing of setting a connection relationship between the input and output channels before the flit arrival time.

17. The packet routing method according to claim 13, wherein the maximum value of deviation of the transmission interval of the packets is recorded in the control packet in the control packet input step, and in the case where an entry in which a packet in the packets has not yet arrived at the time obtained by adding the maximum value of deviation of the transmission interval to the arrival time exits among the records of the flit arrival time, the flit arrival time management step deletes the entry.

18. The packet routing method according to claim 13, wherein the flit arrival time management step is performed in a router which is provided on a route from a transmission source of the packets to a transmission destination of the packets and which curves the route.

19. The packet routing method according to claim 13, wherein in the case where the request from the flit arrival time management step does not require the output channel, the switch assignment step sets the output channel to the input channel such that the route goes straight with respect to the router.

20. The packet routing method according to claim 19, wherein in the case where the output channel is set for the input channel such that the route goes straight with respect to the router, the switch assignment verification step verifies whether the setting corresponds with the actual routing.

* * * * *